US008870407B2

(12) United States Patent
Kim et al.

(10) Patent No.: US 8,870,407 B2
(45) Date of Patent: *Oct. 28, 2014

(54) LIGHTING DEVICE WITH LOUVERS

(71) Applicant: LG Innotek Co., Ltd., Seoul (KR)

(72) Inventors: Dong Soo Kim, Seoul (KR); Yun Ha Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/956,550

(22) Filed: Aug. 1, 2013

(65) Prior Publication Data

US 2014/0003042 A1 Jan. 2, 2014

Related U.S. Application Data

(63) Continuation of application No. 13/344,310, filed on Jan. 5, 2012, now Pat. No. 8,523,393, which is a continuation of application No. 12/845,387, filed on Jul. 28, 2010, now Pat. No. 8,109,647.

(30) Foreign Application Priority Data

| | | |
|---|---|---|
| Jul. 28, 2009 | (KR) | 10-2009-0068922 |
| Apr. 10, 2010 | (KR) | 10-2010-0033032 |
| Apr. 10, 2010 | (KR) | 10-2010-0033033 |
| Apr. 10, 2010 | (KR) | 10-2010-0033034 |
| Apr. 10, 2010 | (KR) | 10-2010-0033035 |

(51) Int. Cl.
*F21V 21/00* (2006.01)
*G02B 5/02* (2006.01)

(Continued)

(52) U.S. Cl.
CPC . *G02B 5/02* (2013.01); *F21V 17/00* (2013.01); *F21S 4/00* (2013.01); *F21S 4/003* (2013.01);

(Continued)

(58) Field of Classification Search
CPC ............ F21S 4/00; F21S 4/003; F21S 4/008; F21S 8/02; F21S 8/026; F21V 17/104; F21V 17/00
USPC ......... 362/219, 221–224, 237, 240–241, 243, 362/249.02, 235, 404, 342, 217.01–217.17, 362/246, 97.1, 97.4
See application file for complete search history.

(56) References Cited

U.S. PATENT DOCUMENTS 4,613,929 A 9/1986 Totten .......................... 362/150
6,558,020 B1 5/2003 Holzer .......................... 362/221

(Continued)

FOREIGN PATENT DOCUMENTS

CH 694 024 A5 6/2004
EP 1 460 334 A1 9/2004

(Continued)

OTHER PUBLICATIONS

Korean Office Action dated Jan. 8, 2011 issued in Application No. 10-2009-0068923.

(Continued)

*Primary Examiner* — Robert May
(74) *Attorney, Agent, or Firm* — Ked & Associates, LLP

(57) ABSTRACT

The lighting device comprises a case comprising: a bottom plate; a first wall extending from the bottom plate; a second wall extending from the bottom plate and facing to the first wall; a first top plate extending perpendicular to the first wall; and a second top plate extending perpendicular to the second wall, a light emitter disposed on the bottom plate of the case; and a diffuser plate spaced apart from the light emitter and disposed between the first wall and the second wall, wherein the first wall and the second wall comprise a coupling recess, and wherein the diffuser plate is coupled to the coupling recess.

20 Claims, 24 Drawing Sheets

(51) Int. Cl.

| | |
|---|---|
| ***F21V 17/00*** | (2006.01) |
| ***F21S 4/00*** | (2006.01) |
| ***F21S 8/02*** | (2006.01) |
| ***F21V 29/00*** | (2006.01) |
| ***F21S 8/04*** | (2006.01) |
| *F21V 7/00* | (2006.01) |
| *F21V 17/10* | (2006.01) |
| *F21V 23/02* | (2006.01) |
| *F21Y 101/02* | (2006.01) |
| *F21Y 105/00* | (2006.01) |

(52) U.S. Cl.

CPC .. *F21S 4/008* (2013.01); *F21S 8/02* (2013.01); *F21V 7/005* (2013.01); *F21V 7/0058* (2013.01); *F21V 17/104* (2013.01); *F21V 23/026* (2013.01); *F21Y 2101/02* (2013.01); *F21Y 2105/001* (2013.01); *F21V 29/20* (2013.01); *F21S 8/04* (2013.01); *F21V 7/00* (2013.01)

USPC .............. 362/217.1; 362/217.14; 362/217.15; 362/217.02

(56) References Cited

U.S. PATENT DOCUMENTS

| | | | | |
|---|---|---|---|---|
| 7,522,249 | B2 * | 4/2009 | Matsuzaki et al. | 349/149 |
| 7,674,010 | B2 | 3/2010 | Griffiths et al. | 362/249.02 |
| 7,766,511 | B2 | 8/2010 | Zampini et al. | 362/294 |
| 7,876,315 | B2 * | 1/2011 | Suzuki et al. | 345/211 |
| 7,922,354 | B2 | 4/2011 | Everhart | 362/235 |
| 7,988,335 | B2 | 8/2011 | Liu et al. | 362/294 |
| 8,100,551 | B2 | 1/2012 | Mayfield, III et al. | 362/223 |
| 8,342,704 | B2 * | 1/2013 | Yamamoto | 362/97.2 |
| 2002/0030993 | A1 | 3/2002 | Itoh | 362/246 |
| 2002/0163803 | A1 | 11/2002 | Tsai | 362/223 |
| 2004/0042203 | A1 | 3/2004 | Ladstatter | 362/147 |
| 2006/0023450 | A1 | 2/2006 | Chung et al. | 362/246 |
| 2007/0002565 | A1 | 1/2007 | Han et al. | 362/240 |
| 2008/0106892 | A1 | 5/2008 | Griffiths et al. | 362/223 |
| 2009/0103288 | A1 | 4/2009 | Boyer et al. | 362/153.1 |
| 2009/0168405 | A1 * | 7/2009 | Yoo et al. | 362/97.2 |
| 2011/0273875 | A1 | 11/2011 | Rohde et al. | 362/235 |
| 2012/0230029 | A1 | 9/2012 | Vanden Eynden et al. | 362/235 |

FOREIGN PATENT DOCUMENTS

| | | | |
|---|---|---|---|
| JP | 62-86601 | | 4/1987 |
| JP | 2000-182429 | | 6/2000 |
| JP | 2006-058485 | A | 3/2006 |
| JP | 2006-267991 | A | 10/2006 |
| JP | 2007-026723 | | 2/2007 |
| JP | 2007-036132 | A | 2/2007 |
| JP | 2007-180005 | A | 7/2007 |
| JP | 2007-242402 | | 9/2007 |
| JP | 3144726 | | 9/2008 |
| JP | 2009-064637 | | 3/2009 |
| JP | 3149047 | U | 3/2009 |
| JP | 2010-118187 | | 5/2010 |
| KR | 10-2004-0063323 | A | 7/2004 |
| KR | 20-0385026 | Y1 | 5/2005 |
| KR | 20-0427241 | Y1 | 9/2006 |
| KR | 10-0883346 | B1 | 2/2009 |
| KR | 20-0444130 | Y1 | 4/2009 |
| WO | WO 2008/047335 | A1 | 4/2008 |
| WO | WO 2010/064573 | A1 | 6/2010 |

OTHER PUBLICATIONS

Korean Office Action dated Apr. 1, 2011 issued in Application No. 10-2009-0068922.

United States Office Action dated Jun. 9, 2011 issued in U.S. Appl. No. 12/845,387.

Notice of Allowance dated Oct. 5, 2011 issued in U.S. Appl. No. 12/845,387.

United States Office Action dated Jun. 13, 2012 issued in U.S. Appl. No. 13/344,310.

United States Final Office Action dated Jan. 24, 2013 issued in U.S. Appl. No. 13/344,310.

European Search Report dated Mar. 21, 2013 issued in Application No. 140 17 0978.

Chinese Office Action dated Mar. 21, 2013 issued in Application No. 201010242715.X (with English translation).

Japanese Office Action issued in related Application No. 2010-169849 dated Nov. 26, 2013.

European Office Action issued in related Application No. 10 170 978.0 dated Dec. 6, 2013.

Japanese Office Action dated Jun. 10, 2014 issued in Japanese Application No. 2010-169849.

Russian Office Action issued in a related Application No. 2010131634 issued on Jul. 11, 2014.

* cited by examiner

LIGHTING DEVICE WITH LOUVERS

CROSS-REFERENCE TO RELATED APPLICATION

This application is a Continuation of application Ser. No. 13/344,310, filed Jan. 5, 2012, which is a Continuation of application Ser. No. 12/845,387, filed Jul. 28, 2010, which claims priority from Korean Application No. 10-2009-0068922, filed Jul. 28, 2009, No. 10-2010-0033032, filed Apr. 10, 2010, No. 10-2010-0033033, filed Apr. 10, 2010, No. 10-2010-0033034, filed Apr. 10, 2010, and No. 10-2010-0033035, filed Apr. 10, 2010, the subject matters of which are incorporated herein by reference.

BACKGROUND

1. Field

One or more embodiments described herein related to providing light.

2. Background

Light emitting diodes (LEDs) generate light more efficiently than electric bulbs. Also, light bulbs have a relatively short lifespan and must be changed frequently compared with LEDs. Light bulbs also consume more power and have other limitations not found in various LED applications.

SUMMARY

One embodiment is a lighting device. The lighting device comprises a case comprising: a bottom plate; a first wall extending from the bottom plate; a second wall extending from the bottom plate and facing to the first wall; a first top plate extending perpendicular to the first wall; and a second top plate extending perpendicular to the second wall, a light emitter disposed on the bottom plate of the case; and a diffuser plate spaced apart from the light emitter and disposed between the first wall and the second wall, wherein the first wall and the second wall comprise a coupling recess, and wherein the diffuser plate is coupled to the coupling recess.

Another embodiment is a lighting device. The lighting device comprises a case comprising: a bottom plate; walls extending from ends of the bottom plate; and extension parts coupled to and inclined from at least one of the walls, and comprising at least one of a louver and a top plate, a light emitter disposed on the bottom plate of the case; a diffuser plate spaced apart from the light emitter and disposed between the walls of the case; and side covers coupled to both ends of the case and having a coupling hole, wherein at least one of the walls and the extension parts comprises a coupling recess arranged the coupling hole of the side covers, wherein the side covers are coupled to the case by allowing a screw or a pin to pass through the coupling holes and the coupling recess.

Another embodiment is a lighting device. The lighting device comprises a case comprising: a bottom plate; a first wall extending from a first end of the bottom plate; a second wall extending from a second end of the bottom plate; a first louver coupled to and inclined from the first wall; and a second louver coupled to and inclined from the second wall, a light emitter disposed on the bottom plate of the case; a diffuser disposed on the light emitter and disposed between the walls of the case, wherein at least one of the walls comprises a coupling recess and the diffuser plate is coupled to the coupling recess, wherein the first louver and the second louver are oriented at an obtuse angle relative to the diffuser plate, and wherein a louver cut-off angle of at least of the first louver and the second louver is less than 90 degrees above 0 degrees.

DETAILED DESCRIPTION

Figure 1:
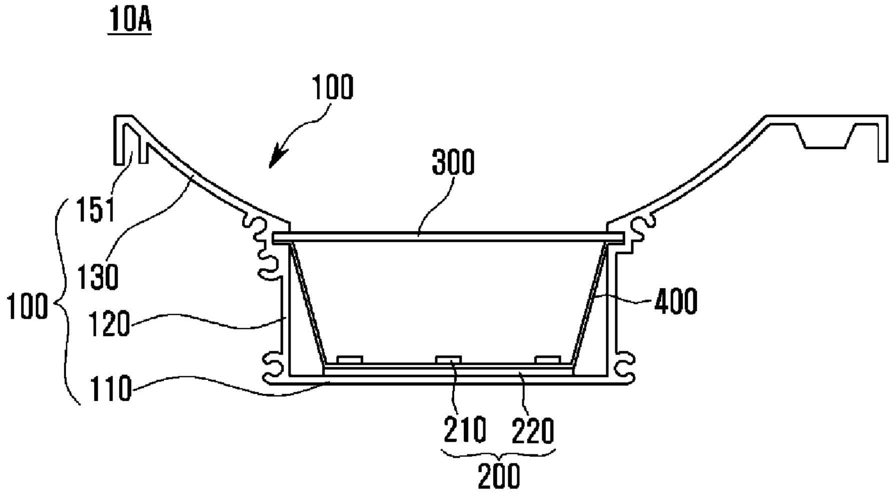
FIG. 1 is a cross-sectional view of a first single lighting module 10A.
Figure 2:
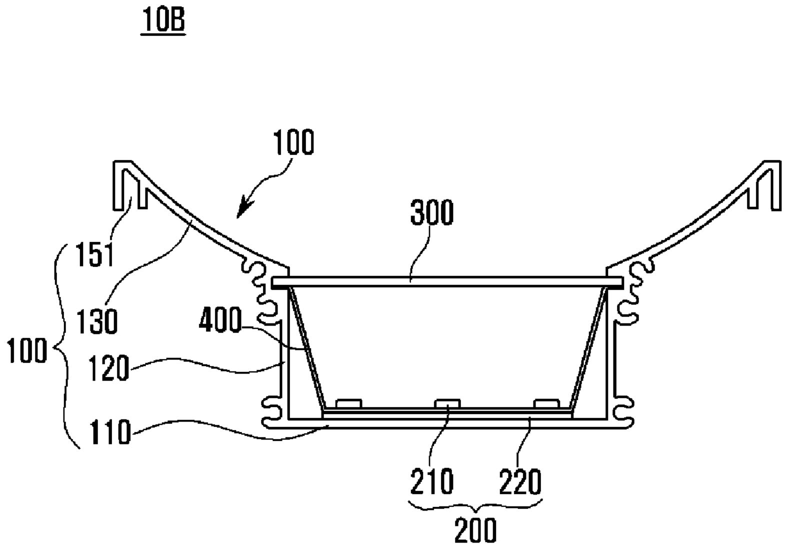
FIG. 2 is a cross-sectional view of a second single lighting module 10B.
Figure 3:
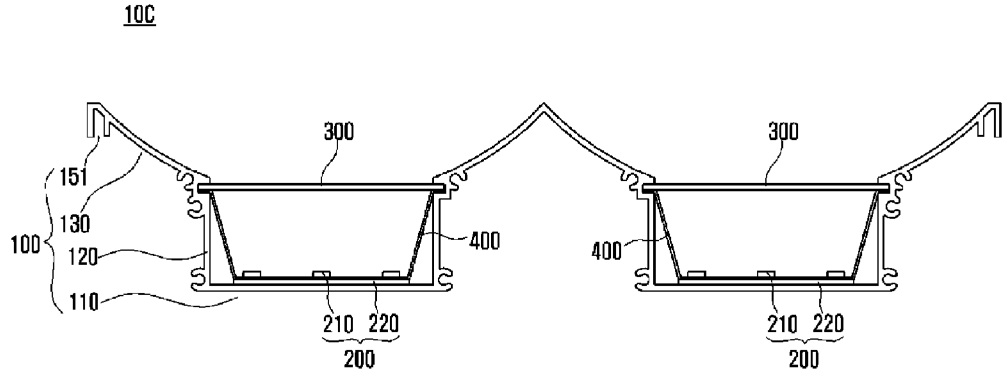
FIG. 3 is a cross-sectional view of a third single lighting module 10C.
Figure 4:
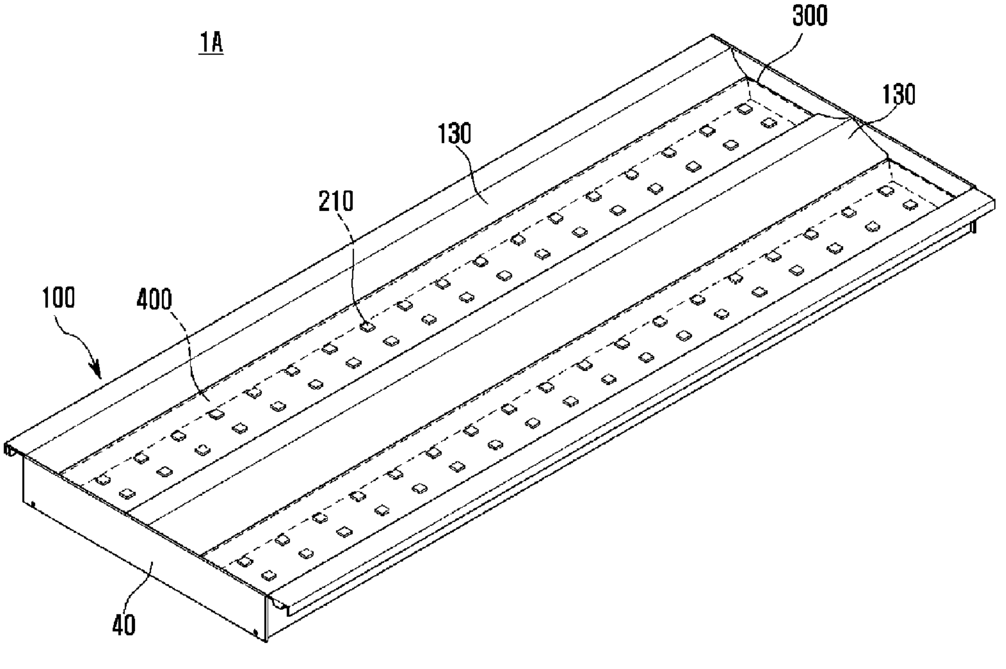
FIG. 4 is a diagram showing a first embodiment of a lighting device.
Figure 8:
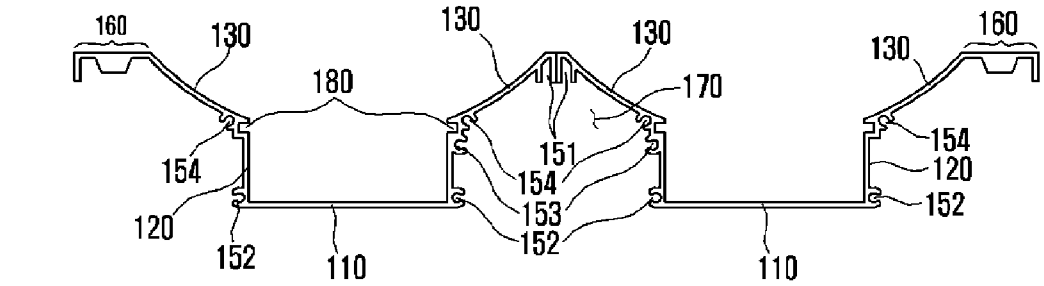
FIG. 8 is a diagram of a lighting device arrangement based on the first embodiment.

FIGS. 1 to 3 show various single lighting modules 10A, 10B, and 10C and FIG. 8 shows another type of lighting module. Many of the remaining figures show different views or arrangements of these and/or other modules used to form lighting devices.

As shown in FIGS. 1 to 3 and 8, each lighting module may include a case 100, a light emitter 200 seated on the bottom plate 110 of the case 100, a reflector 400 which is in contact with and disposed on the top surface of the light emitter 200, and a diffuser plate 300 spaced from and disposed over the light emitter 200.

Figure 7:
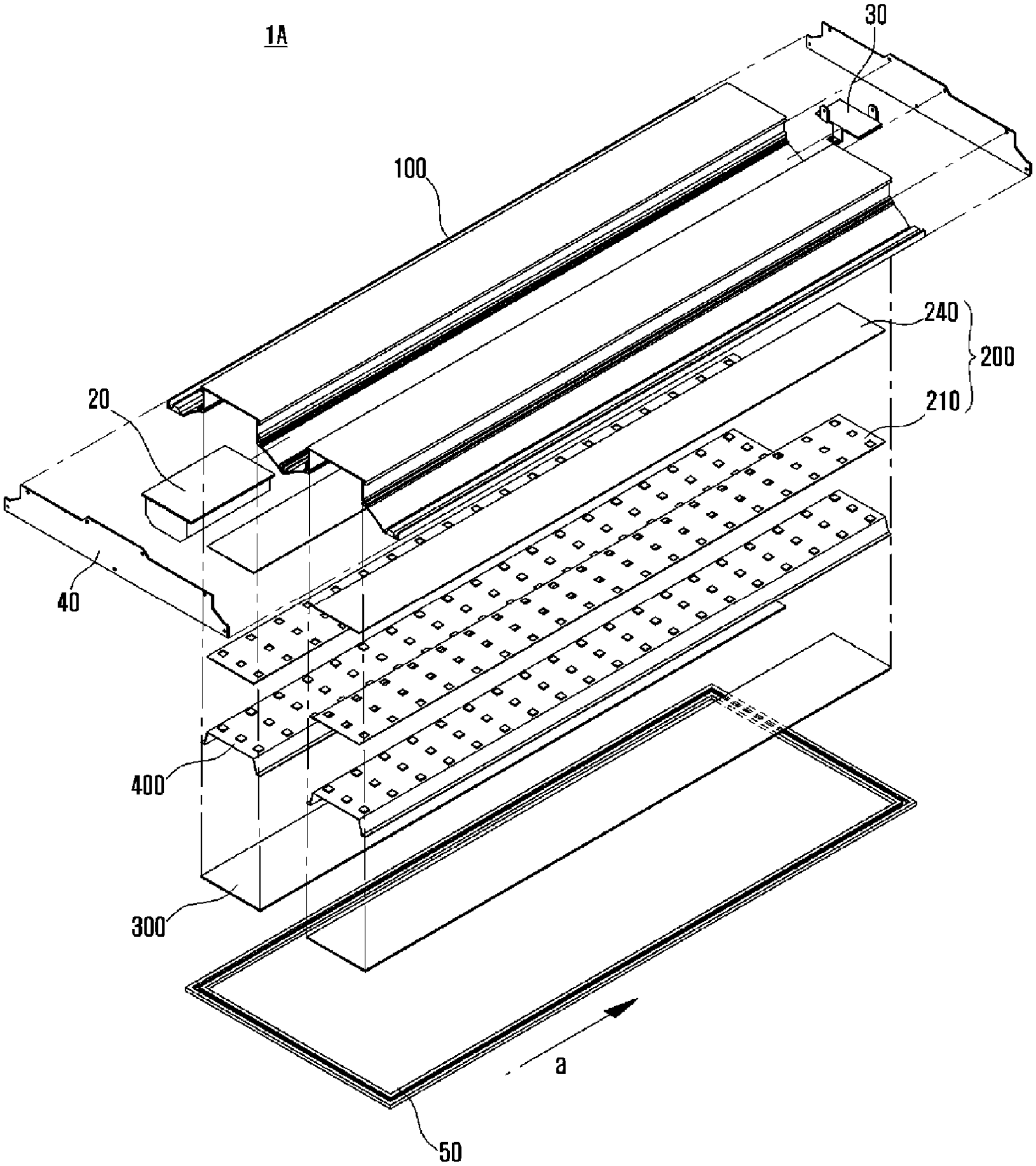
FIG. 7 is another view of the lighting device of the first embodiment.
Figure 13:
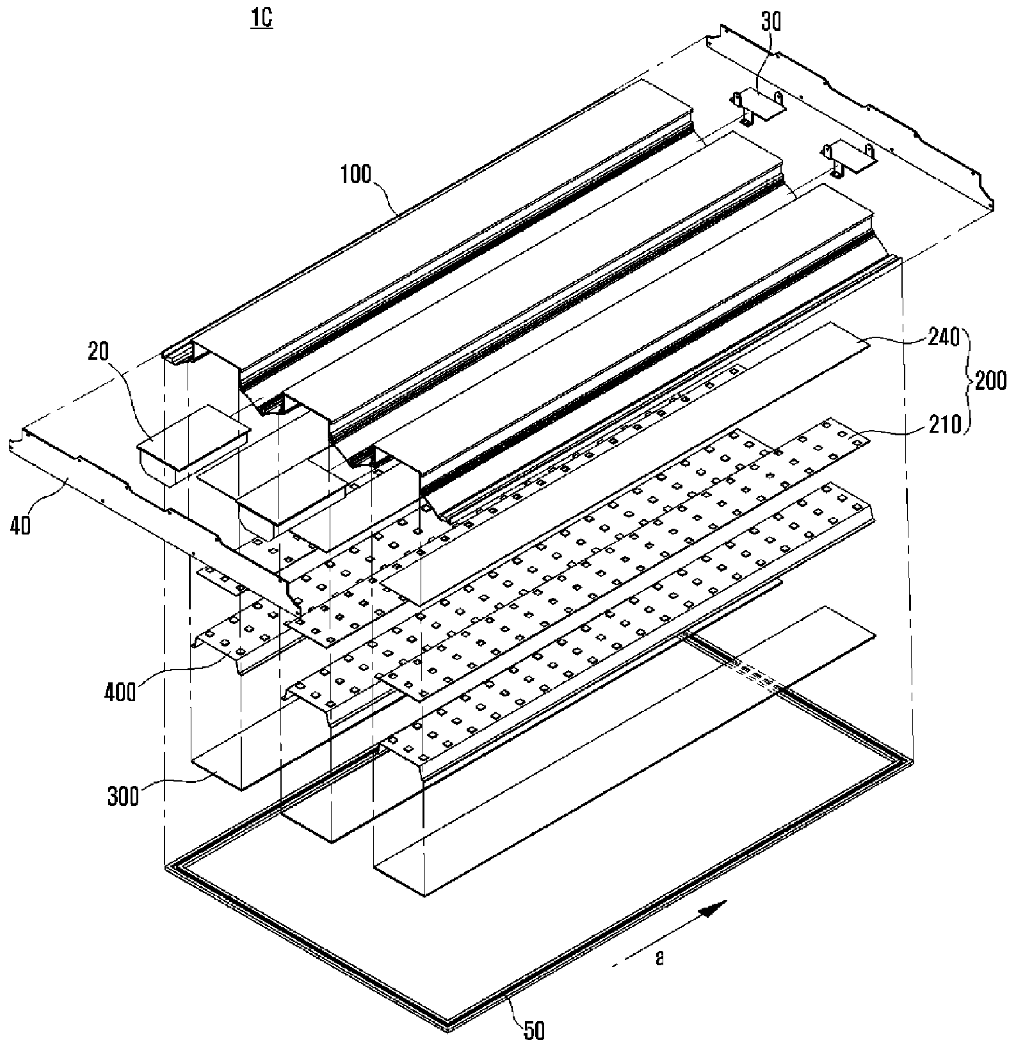
FIG. 13 is a diagram of a third embodiment of a lighting device.

In FIG. 1, single lighting module 10A is used to form a lighting device of a first embodiment, in which two single lighting modules 10A are coupled to each other in a direction perpendicular to the direction "a" as shown in FIG. 7. This same embodiment may be used to form another embodiment of a lighting device, in which three single lighting modules are coupled and light emitters 200 are provided in a direction perpendicular to direction "a" as shown in FIG. 13. In this embodiment, two single lighting modules 10A may be arranged at respective sides of the three single lighting modules. In other embodiments, four or more single lighting modules may be coupled together with attendant light emitters 200 arranged in a direction perpendicular to direction "a" and with single lighting modules 10A arranged at respective sides.

Referring to FIGS. 1, 5, 6 and 8, the case 100 of the first single lighting module 10A includes the bottom plate 110, a side wall 120 vertically extending from the both ends of the bottom plate 110, a louver 130 extending from the end of the side wall 120 and inclined at an obtuse angle with respect to the surface of the diffuser plate 300. Another embodiment of a lighting device shown in FIGS. 11 and 12 replaces the louvers with a top plate 140 as will be described in greater detail below.

In addition to the foregoing features, a first bracket coupler 151 for interconnecting the two adjacent single lighting modules is formed at one end of the louver 130 on one side of the case 100 of the first single lighting module 10A. A ceiling fixed-type frame 160 with coupler is formed at the end of the louver 130 on the other side of the case 100.

While the first bracket coupler 151 is avoidably formed at the end of the louver 130 on one side of the case 100 of the first single lighting module 10A, the ceiling fixed-type frame 160 is not necessarily formed at the end of the louver 130 on the other side of the case 100. Accordingly, the first single lighting module 10A has the first bracket coupler 151 formed at the end of the louver 130 on only one side of the case 100. Here, from this point of view, the first single lighting module 10 is different from the second single lighting module to be later described.

The lighting module 10B shown in FIG. 2 may be used to form another embodiment of a lighting device, which includes only one single lighting module having one light emitter 200. Otherwise, when a lighting device is formed by coupling the three single lighting modules having respectively one light emitter 200 in a direction perpendicular to the direction "a" in FIG. 13, single lighting modules 10B may be arranged in the middle or at respective sides of the three single lighting modules 10.

When a lighting device of another embodiment (not shown) is formed by coupling four or more single lighting modules having respectively one light emitter 200 in a direction perpendicular to the direction "a" in FIG. 13, single lighting modules 10B may be arranged in the middle or at both sides of the single lighting modules 10.

Figure 14:
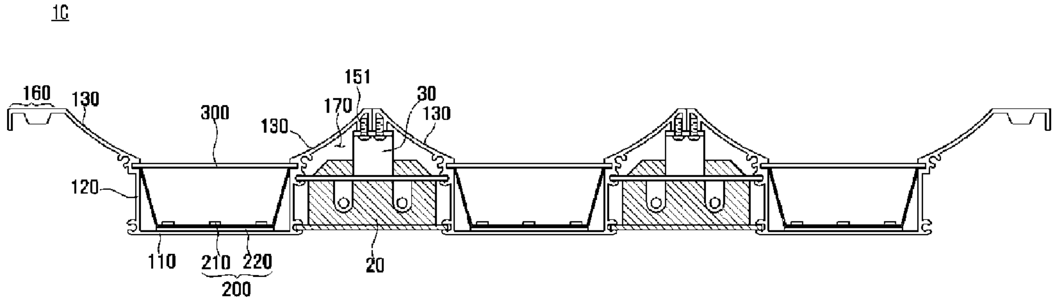
FIG. 14 is a cross-sectional view of the lighting device of the third embodiment.

Referring FIGS. 2, 13 and 14, the case 100 of the second single lighting module 10B includes the bottom plate 110, the side wall 120 vertically extending from the both ends of the bottom plate 110, the louver 130 extending from the end of the side wall 120 and inclined at an obtuse angle with respect to the surface of the diffuser plate. The top plate 140 may be included instead of the louver 130. The first bracket couplers 151 for interconnecting the single lighting modules 10 is formed at the ends of both louvers 130 of the case 100 of the second single lighting module 10B.

Figure 16:
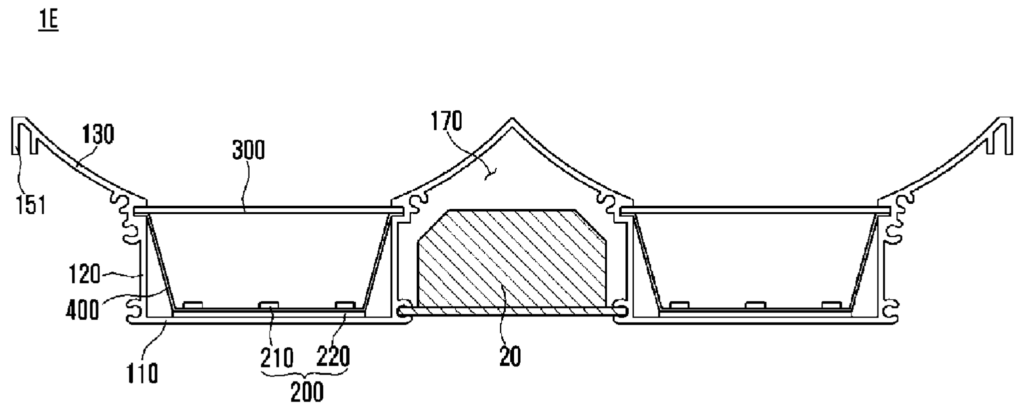
FIG. 16 is a diagram of a fifth embodiment of a lighting device.

The single lighting module 10C of FIG. 3 may be used to form a lighting device of another embodiment as shown in FIG. 16. The lighting device of this embodiment includes only one single lighting module having two light emitters 200. Otherwise, the single lighting module 10C is used to form a lighting device of still another embodiment in which the two single lighting modules 10C having respectively two light emitters 200 are coupled to each other in a direction perpendicular to the direction "a" of FIG. 19.

Figure 19:
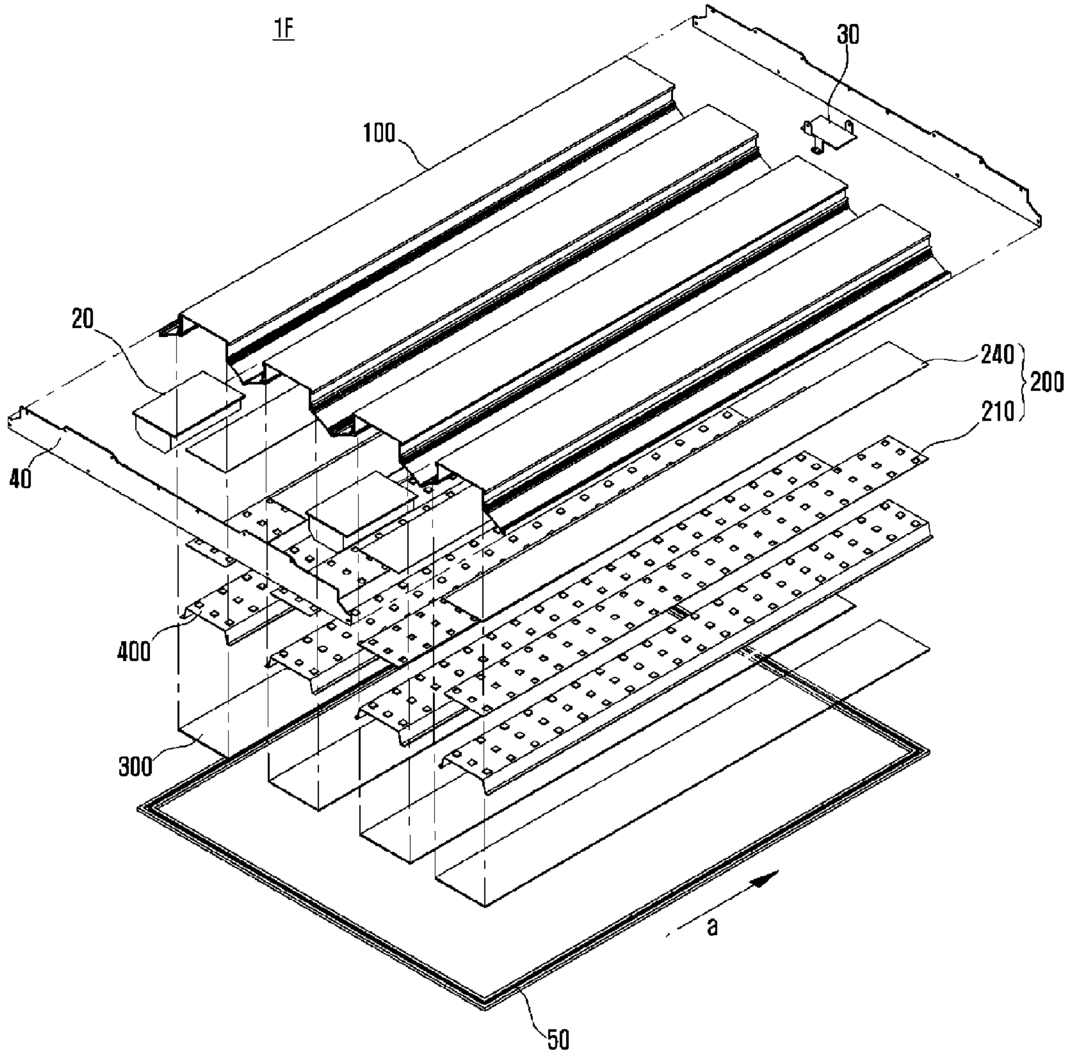
FIG. 19 is a diagram of a sixth embodiment of a lighting device.

Otherwise, single lighting module 10C is used to form a lighting device of another embodiment (not shown) in which three or more two single lighting modules 10C having respectively two light emitters 200 are coupled to each other in a direction perpendicular to the direction "a" of FIG. 19. The various embodiments of the lighting device will now be described in greater detail below.

First Embodiment

Referring to FIGS. 4 to 8, a lighting device 1 may include two single lighting modules 10A, a power supply controller 20 located in a space 170 between the single lighting modules, a bracket 30 for interconnecting the single lighting modules, and side cover 40. As shown in FIG. 1, each single lighting module 10A used in the first embodiment may include the case 100, the light emitter 200 received by the case 100, and a diffuser plate 300 spaced from the light emitter 200, and a reflector 400.

In a variation, two single lighting modules 10B (FIG. 2) may be used to construct the first embodiment. The second single lighting module 10B has the first bracket couplers 151 formed at the ends of both louvers 130. Therefore, in forming the overall external appearance shown in the first embodiment, the appearance and function of the lighting device formed by coupling the two single lighting modules 10B are different from those of the lighting device formed by coupling the two first single lighting modules 10A.

Figure 5:
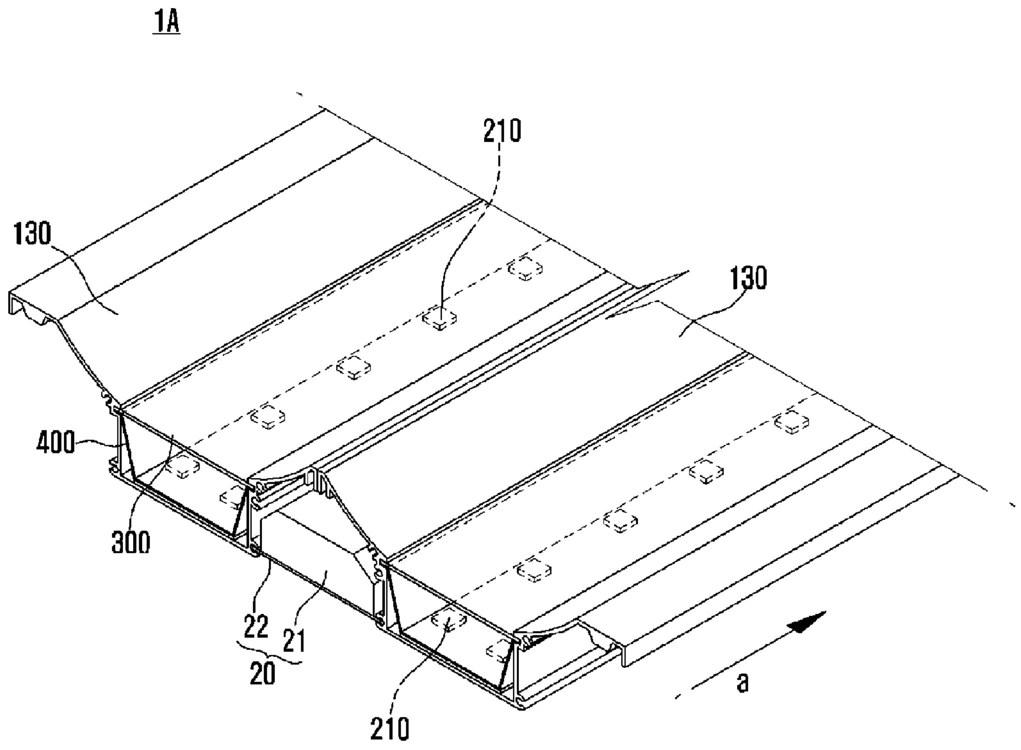
FIG. 5 is a cross-sectional view of the lighting device of FIG. 4.
Figure 6:
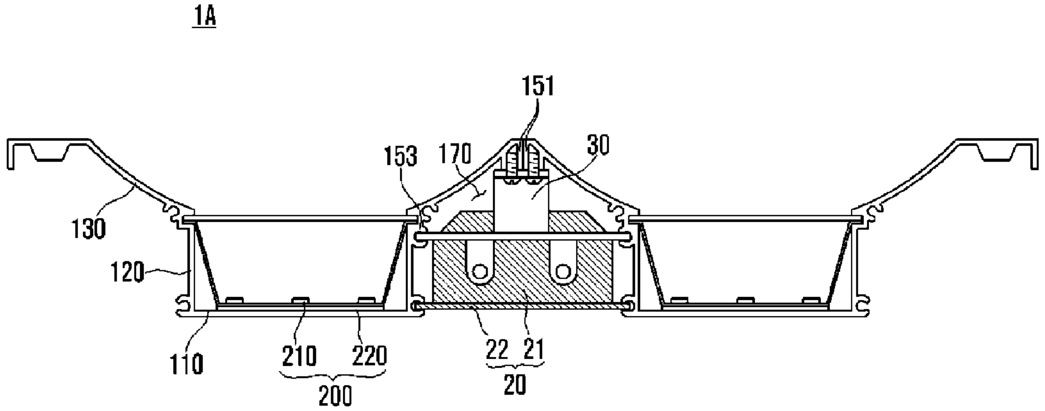
FIG. 6 is another view of the lighting device of the first embodiment.

Referring to FIGS. 5 and 6, the light emitter 200 may be arranged on the bottom plate 110 of the case 100. The power supply controller 20 may be arranged in a space 170 between the single lighting modules 10A. That is, the space is formed by the louver 130 in which the first bracket coupler 151 are formed and by the side wall 120 connected to the louver 130. In this case, since the power supply controller 20 is stacked under the bottom plate 110 and arranged in a horizontal direction to the bottom plate 110 instead of in a vertical direction, the lighting device 1 has a thickness smaller than that of a usual lighting device.

One or more embodiments described herein may be suitable for mounting to a ceiling. The ceiling of a building in which a ceiling-buried type lighting device is disposed has generally a concrete structure. A structure called an M-BAR or a T-BAR is provided in a direction from the ceiling to the bottom surface of the building. Tex and the like are added to the M-BAR or T-BAR.

Generally, in a directly downward type lighting device provided on the ceiling of the building, the power supply controller 20 is stacked under the bottom plate 110 and arranged in a vertical direction, so that the thickness of the lighting device is often greater than 70 mm. However, since electrical wiring, air conditioning pipes and the like are arranged between the ceiling of the concrete structure and the M-BAR or T-BAR, it is often the case that a space for disposing a lighting device is very small. Therefore, when a usual directly downward type lighting device is buried and disposed on the ceiling due to the space constraint, it is required that the M-BAR be partly truncated or the lighting device be provided at an undesired position.

On the other hand, since lighting device 1A has comparatively lesser thickness (e.g., about 45 mm), it is possible to easily and simply install the lighting device on the ceiling regardless of narrow space as described above. The thickness of 45 mm is provided for illustration only in order for comparison to a conventional lighting device. Thus, the size of the lighting device 1A may be changed depending, for example, on numerical values of the thickness of the power supply controller 20 and/or the case 100 and the like.

While the lighting device 1A may have a rectangular shape extending in the first direction "a", the lighting device 1A may have various shapes in accordance with its installation position and its installation environment.

Also, louvers 130 of the light emitter 200 may be inclined at an obtuse or other angle with respect to the surface of the diffuser plate 300 for the purpose of allowing light emitted from the light emitter 200 to be emitted and to have a desired light distribution angle and for alleviating glare from the light. If it is not possible to specify an angle based on the diffuser plate 300 due to no diffuser plate 300, the louver 130 may be specified to be extended from the end of the side wall 120 and to be inclined more outward than the side wall 120. The inclination of the louver 130 may be changed according to the design of the lighting device 1A.

Figure 9:
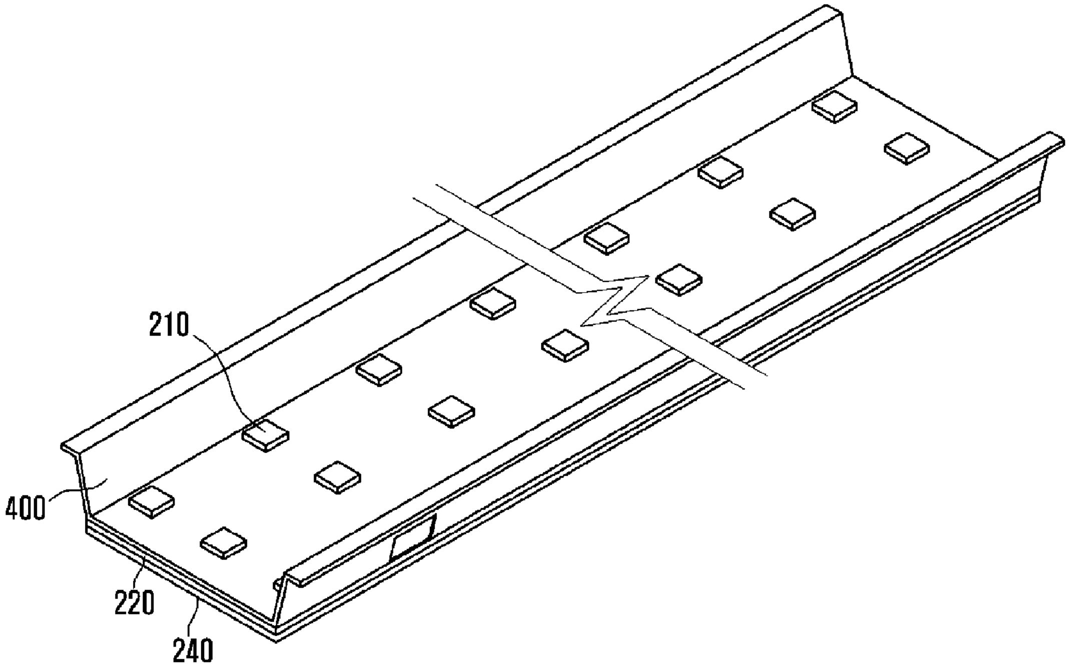
FIG. 9 is a diagram of a light emitter and reflector are coupled to each other.
Figure 10:
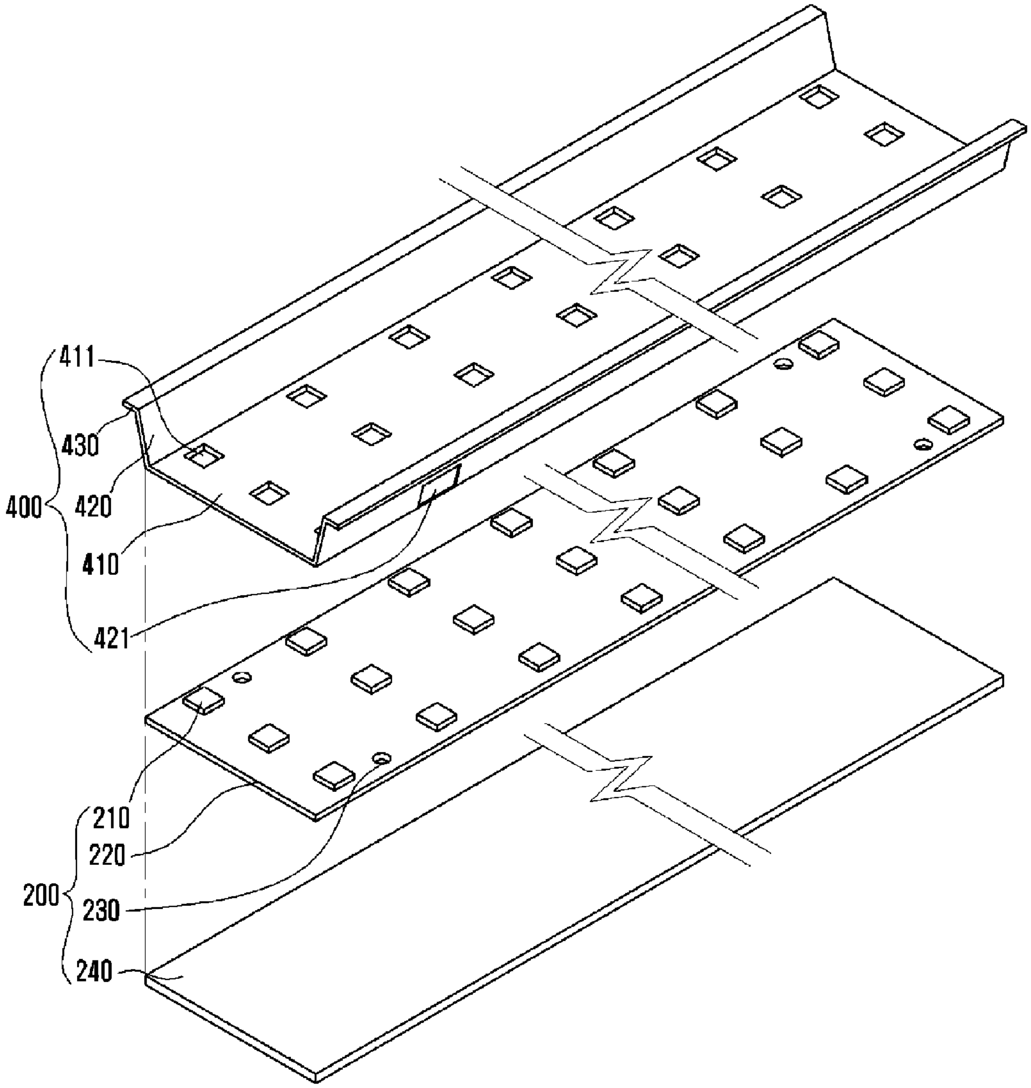
FIG. 10 is another diagram of a light emitter and reflector.

Referring to FIGS. 9 and 10, the light emitter 200 may include LEDs 210, a substrate 220 on which the LEDs 210 are mounted, and a heat radiating sheet 240 arranged under the substrate 220. The substrate 220 may have a coupling hole 230 for coupling the case 100 to the substrate 220.

The lighting device may further include reflector 400. The reflector 400 reflects light emitted from the LED 210 to the outside of the lighting device 1A and covers the inner surface of the side wall 120 of the case 100. It is preferable that the reflector 400 covers not only the inner surface of the side wall 120 but the surface of the substrate 220 of the light emitter 200 other than an area on which the LEDs 210 are arranged.

The power supply controller 20 may include a power supply unit (PSU) and a driving part. The power supply unit (PSU) supplies electric power to the lighting device 1A, and the driving part controls, starts and operates the light emitter 200.

Referring to FIG. 5, the diffuser plate 300 is disposed apart from the light emitter 200 in the direction in which light is irradiated from the LED 210. The diffuser plate 300 allows the light emitted from the LEDs 210 each of which functions as a point light source to actually function as a surface light source such that the light emitted from the light emitter 200 obtains a uniform luminance with respect to the surface of the diffuser plate 300.

The light emitter 200 is arranged on the bottom plate 110 of the case 100 instead of on the entire surface of the lighting device 1. Accordingly, when a predetermined number of the LEDs 210 is used, an interval between the LEDs 210 arranged on the bottom plate 110 of the case 100 is less than an interval between the LEDs 210 arranged on the entire surface of the lighting device. Moreover, the amount of the substrate 220 used may be also reduced.

Meanwhile, in order that the light emitted from the LED 210 functioning as a point light source can actually function as a surface light source by passing through the diffuser plate 300, it is necessary to form a diffuse plate surface area, in which the light emitted from LED 210 adjacent to the aforesaid LED 210 is superposed on the light emitted from the aforesaid LED 210. This means that the LED 210 should be sufficiently spaced from the diffuser plate 300.

However, as the spaced distance is increased, the thickness of the lighting device 1A is increased. Therefore, this may not be preferable for all applications. The distance between the LEDs 210 may be reduced in order to reduce the spaced distance.

As described above, since the light emitter 200 is arranged on the bottom plate 110 of the case 100 instead of on the entire surface of the lighting device 1, the width of the substrate 220 of the light emitter 200 is limited to the width of the bottom plate 110 of the case 100. Eventually, the interval between the LEDs 210 arranged on the substrate 220 is naturally reduced, so that the interval between the LED 210 and the diffuser plate 300 is also reduced. The interval between the LED 210 and the diffuser plate 300 is required to form the surface light source.

Accordingly, because of the structural benefits mentioned above, a slim lighting device 1A can be provided. In a state where there is no diffuser plate 300, if light is irradiated from each of the LEDs to the irradiated area, a hot spot may occur.

More specifically, when the shape of a light source itself is directly irradiated to the irradiated area, an area onto which light is illuminated is more clearly distinct than an area onto which light is not illuminated. Here, an area onto which light is irradiated such that the boundary between the surrounding dark area and the area onto which light is illuminated is clearly formed may be referred to as a hot spot. When a hot spot occurs in general indoor lighting or outdoor lighting such as a street lamp and the like instead of a spot light, the uniformity of the irradiated area is reduced. This may not be preferable for all applications.

However, when a surface lighting device is used in accordance with one or more embodiments described herein, the existence of a hot spot may be reduced by more than that of a general point lighting device. Therefore, in accordance with the embodiments herein, it may be possible to obtain a uniform illuminance distribution of the irradiated area and to reduce the fatigue of the eyes.

Second Embodiment

Figure 11:
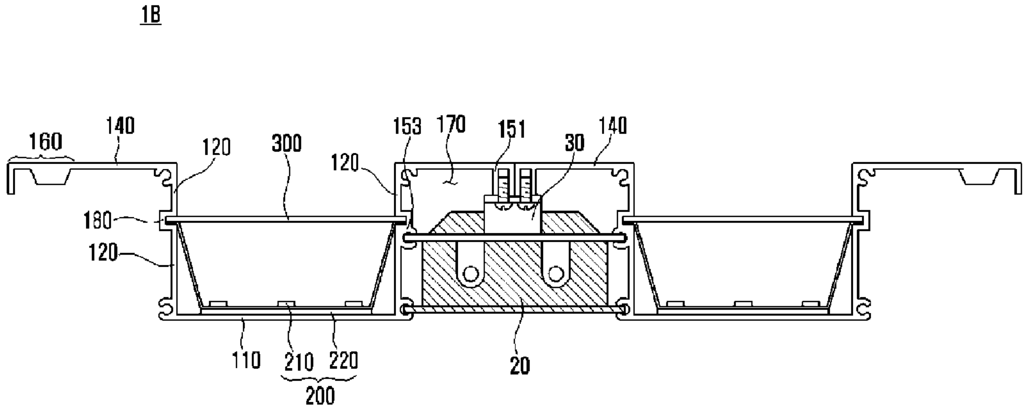
FIG. 11 is a cross-sectional view of a second embodiment of a lighting device.
Figure 12:
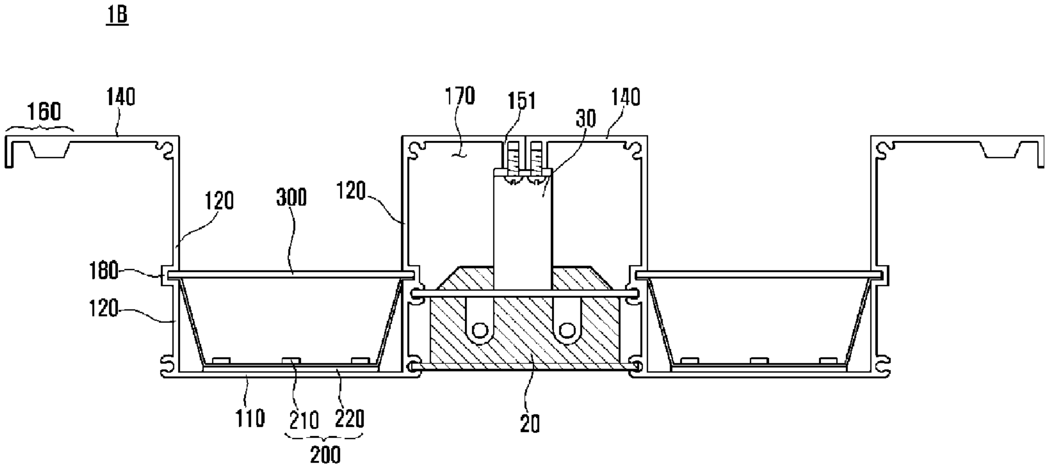
FIG. 12 is a diagram of another lighting device according to the second embodiment.

FIG. 11 shows, in cross-section, a second embodiment of a lighting device 1B, and FIG. 12 shows another example of lighting device 1B. One difference between the lighting device according to the second embodiment and the lighting device according to the first embodiment is that the case 100 includes the top plate 140 instead of the louver 130.

More specifically, as shown in FIGS. 11 and 12, a lighting device according to the second embodiment is formed by using the two single lighting modules 10B. The second single lighting module 10B has the first bracket couplers 151 formed at the ends of both top plates 140. Therefore, in forming the overall external appearance, the appearance and function of the lighting device formed by coupling the two single lighting modules 10B are different from those of the lighting device formed by coupling the two first single lighting modules 10A.

Referring to FIG. 12, when a distance between the diffuser plate 300 and the light emitter 200 is maintained to be substantially equal to that of FIG. 11, the side wall 120 extends higher than that of FIG. 11. As a result, a diffuser plate coupling groove 180 is formed in the middle of the side wall 120. In this case, because the side wall 120 is perpendicular to the bottom plate 110 and/or the diffuser plate 300 and extends higher than the side wall of the first embodiment, glare may be prevented more effectively than that of the first embodiment.

However, the extent of the area of the bottom surface onto which light is irradiated becomes less than that of the first embodiment. Otherwise, the uniformity of the illuminance distribution of the irradiated area is reduced more than that of the first embodiment. Accordingly, it may be desirable for some applications to install and use the lighting device 1B of the second embodiment in a condition where glare prevention is required prior to both the extent of the area onto which light is irradiated and the illuminance distribution of the irradiated area.

Third Embodiment

FIG. 13 shows a third embodiment of a lighting device 1C and FIG. 14 shows a cross-sectional view of this device. Referring to FIGS. 13 and 14, the lighting device 1C may include two single lighting modules 10A, one single lighting module 10B located between the two first single lighting modules 10A, a power supply controller 20 located in one or two spaces 170 formed between the first single lighting module 10A and the second single lighting module 10B, a bracket 130 for interconnecting the single lighting modules, and side cover 40. The single lighting modules may include case 100, light emitter 200 received by the case 100, and diffuser plate 300 spaced from the light emitter 200, and reflector 400.

Referring to FIGS. 13 and 14, while two single lighting modules 10A and one single lighting module 10B may be included in one form of the third embodiment, in variation three single lighting modules 10B may be used to construct the third embodiment.

In forming the lighting device by coupling a plurality of the single lighting modules, the single lighting module 10A may include only one first bracket coupler 151, so that the first single lighting module 10A can be used only on both sides of the lighting device. On the contrary, the single lighting module 10B may include the first bracket couplers 151 at the ends of both louvers 130, so that the single lighting module 10B can be used on both sides or in the middle of the lighting device.

The appearance and function of the lighting device formed by coupling the three single lighting modules 10B are different from those of the lighting device formed by coupling two single lighting modules 10A to the one single lighting module 10B.

In the third embodiment, at least one power supply controller 20 is required to start and operate the three light emitters 200. While the drawings show that two power supply controllers 20 controls the three light emitters 200, one power supply controller 20 is able to control the three light emitters 200. The position of one or more power supply controllers 20 has been already described above.

Though not shown in FIGS. 13 and 14, the lighting device according to the third embodiment may include the top plate 140 instead of the louver 130, like the lighting device according to the second embodiment.

Fourth Embodiment

Figure 15:
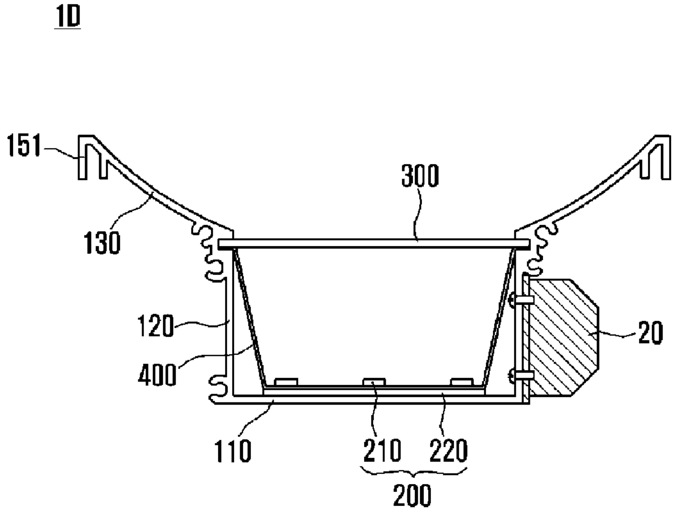
FIG. 15 is a diagram of a fourth embodiment of a lighting device.

FIG. 15 shows a fourth embodiment of a lighting device 1D which may include one single lighting module 10B, the power supply controller 20 located on the outer lateral surface of one side wall 120 among two side walls 120 of the case 100 of single lighting module 10B, and side cover 40. Here, the case 100 of the single lighting module 10B includes the bottom plate 110, the side wall 120 vertically extending from the both ends of the bottom plate 110, and the louver 130 extending from the end of the side wall 120 and inclined at an obtuse angle with respect to the surface of the diffuser plate. The first bracket couplers 151 for interconnecting the single lighting modules 10 is formed at the ends of both louvers 130 of the case 100 of the single lighting module 10B.

In the fourth embodiment, unlike the first, second and third embodiments, because only one single lighting module 10 is provided, there is no space 170 formed by the two louvers 130 and the side wall 120 connected to the louvers 130. Therefore, the power supply controller 20 is located on the outer lateral surface of one side wall 120 among two side walls 120 of the case 100 of the second single lighting module 10B.

Also, unlike the first, second and third embodiments, the power supply controller 20 may be unstably fixed. For this reason, after holes are formed through the side wall 120 and holes are also formed through the power supply controller 20, the holes of the side wall 120 and the holes the power supply controller 20 are aligned with each other. Subsequently, the case 100 is coupled to the power supply controller 20 by allowing a screw or a pin to pass through the holes formed both in the side wall 120 and in the power supply controller 20. However, a separate bracket (not shown) for coupling the power supply controller 20 to the side wall 120 is formed without forming the hole in the side wall 120 of the case 100, so that the case 100 is coupled to the power supply controller 20.

In a variation, the lighting device according to the fourth embodiment may include the top plate 140 instead of the louver 130, like the lighting device according to the second embodiment.

Fifth Embodiment

FIG. 16 shows a fifth embodiment of a lighting device 1E. One difference between this embodiment and the lighting devices of the first, second, and third embodiments is that the fifth embodiment uses single lighting module 10C including two light emitters 200 instead of single lighting modules 10A and 10B which use one light emitter.

Figure 17:
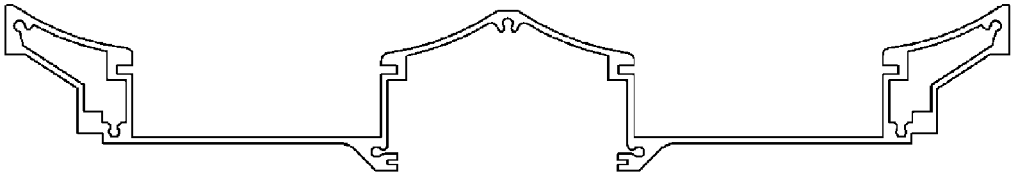
FIG. 17 is another view of a lighting device according to the fifth embodiment.
Figure 18:
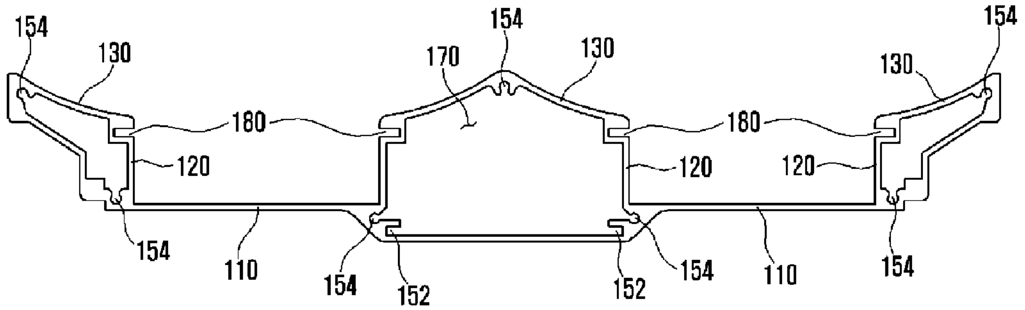
FIG. 18 is another view of a lighting device according to the fifth embodiment.

Referring to FIGS. 16 to 18, the width of the single lighting module 10C used in the lighting device according to the fifth embodiment is approximately twice as large as widths of the first and the single lighting modules 10A and 10B used in the lighting device according to the first to the fourth embodiments. The fifth embodiment includes only one single lighting module and a space for receiving the power supply controller 20 without interconnecting the single lighting modules.

Compared with FIG. 17, FIG. 18 shows that the case 100 may further include a cover part formed therein for covering the space 170 for receiving the power supply controller 20. The power supply controller 20 is surrounded by the case 100, so that the power supply controller 20 cannot be seen when the case 100 is viewed from the top thereof and the bottom thereof.

Referring to FIG. 16, even though the first bracket coupler 151 for interconnecting the single lighting modules is formed at the ends of both louvers 130 of the case 100 of the single lighting module 10C, the first bracket coupler 151 may be formed at the end of only one louver 130 among both the outer louvers 130.

Referring to FIGS. 17 and 18, unlike the case 100 used in FIG. 16, the case 100 includes a closed space formed therein by the outermost louver 130, the outermost side wall 120 and an additional member spaced apart from the outermost louver 130 and the outermost side wall 120. In operation, heat generated by the operation of the lighting device is transferred to the additional member, so that the whole case is able to function as a heat radiation body. As a result, the surface area of the heat radiation body is increased, thereby improving the heat radiating effect thereof. For some applications, it may be desirable to form case 100 through an extruding molding method in order to more enhance the heat radiating effect by using the additional member.

Referring to FIG. 16, the lighting device 1E may include one single lighting module 10C, the power supply controller 20 located in the space 170 formed by the two inner side walls 120 and the two louvers 130 of the single lighting module 10C, and side cover 40. Here, the single lighting module 10C may include the case 100, two light emitters 200 received by the case 100, and two diffuser plates 300 spaced from the two light emitters 200, and reflector 400.

The case 100 of the single lighting module 10C includes two bottom plates 110, four side walls 120 vertically extending from the both ends of each of the two bottom plates 110, the louvers 130 extending from the end of the side wall 120 and inclined at an obtuse angle with respect to the surface of the diffuser plate 300. The ends of the two inner louvers 130 are connected to each other. If there is no diffuser plate 300, the louver 130 may be specified to be extended from the ends of the two outermost side walls 120 and to be inclined more outward than the side wall 120. In a variation, the lighting device according to the fifth embodiment may include the top plate 140 instead of the louver 130.

Sixth Embodiment

FIG. 19 shows a sixth embodiment of a lighting device 1F the single lighting module 10C including two light emitters 200. Therefore, the lighting device 1F according to the sixth embodiment may use the cases 100 of FIGS. 17 and 18.

Figure 20:
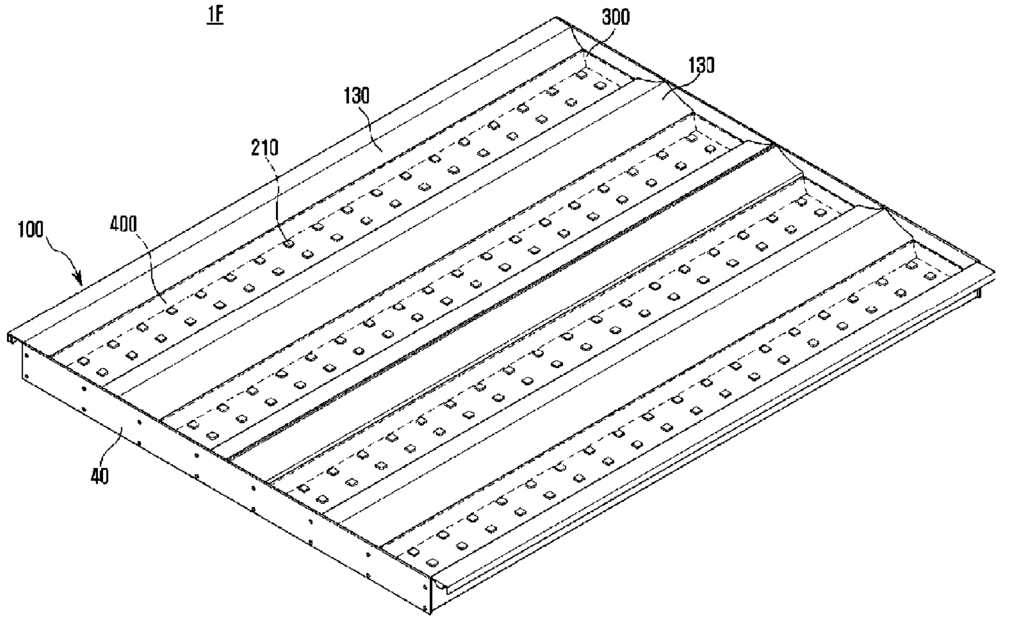
FIG. 20 is another view of a lighting device according to the sixth embodiment.
Figure 21:
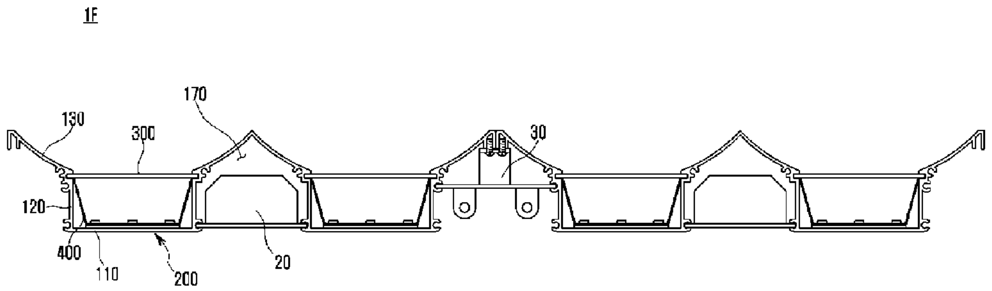
FIG. 21 is another view of a lighting device according to the sixth embodiment.

Referring to FIGS. 19 to 21, the lighting device 1F may include two single lighting modules 10C, the power supply controller 20 located in the space 170 formed by the two inner side walls 120 and the two louvers 130 of each of the third single lighting modules 10C, and side cover 40. Here, unlike the lighting device shown in FIGS. 19 to 21, the lighting device 1F may include only one power supply controller 20 instead of two power supply controllers 20. In this case, the one power supply controller 20 controls the total of four light emitters 200. The power supply controller 20 may be located either in the space 170 formed by the two louvers 130 and the two inner side walls 120 of the single lighting module 10C or in a space formed by coupling the two single lighting modules through the bracket 30 in FIG. 21. Moreover, the lighting device 1F may include the top plate 140 instead of the louver 130, just like the lighting device according to the fifth embodiment.

Unlike the cases 100 of the third single lighting module shown in FIGS. 3 and 16, the first bracket coupler 151 may formed at the end of only one louver 130 among both the outer louvers 130. In this case, only two single lighting modules 10C can be coupled to each other. Three or more single lighting modules 10C cannot be coupled to each other. Therefore, there is no problem in implementing the sixth embodiment. Hereinafter, various components of the embodiments of lighting device will be described.

Case 100

Referring to FIGS. 6 and 8, when the single lighting modules are coupled adjacently to each other, the power supply controller 20 is arranged in the space 170 formed by the louver 130 and the side wall 120. When a second projection 22 formed in the lower end of the power supply controller 20 is pushed in a sliding way into a power supply controller coupling groove 152 formed at the boundary between the side wall 120 and the bottom plate 110 of the case 100, the case 100 can be strongly coupled to the power supply controller 20.

Meanwhile, the power supply controller coupling groove 152 is not necessarily formed extending as much as the length of the case 100 in the first direction "a" shown in FIG. 7. For example, the power supply controller coupling groove 152 may be extended relatively extremely short and be a thin plate having a shape of alphabet letter "C" or "O."

In addition, without the power supply controller coupling groove 152, after holes are formed through the side wall 120 of the case 100 and holes are also formed through the power supply controller 20, the holes of the side wall 120 and the power supply controller 20 are aligned with each other. Subsequently, the case 100 is coupled to the power supply controller 20 by allowing a screw or a pin to pass through the holes formed both in the side wall 120 and in the power supply controller 20. However, if the power supply controller coupling groove 152 is formed in the case 100, it is easier to produce the case 100 by using an extruding molding method and it is simple to couple the case 100 to the power supply controller 20 without an additional screw or a pin.

The bracket coupler includes the first bracket coupler 151 and a second bracket coupler 153. The first and the second bracket couplers 151 and 153 may be formed in the case 100. The first and the second bracket couplers 151 and 153 are connected to the bracket 30, so that the single lighting modules are securely interconnected to each other. A side cover coupling groove 154 may be formed in the case 100. The side cover coupling groove 154 is used to couple the side cover 40 to the case 100. A method by which the side cover coupling groove 154 are coupled to the side cover 40 will be described in another part of this application.

The case 100 may be formed, for example, of a metallic material or a resin material and the like which has a good heat radiating characteristic. An aluminum (Al) oxide film or silver (Ag) oxide film is formed on the surface of the case 100, so that abrasion resistance, corrosion resistance and endurance of the case 100 can be obtained and a good appearance of the lighting device 1 can be obtained. The louver 130 performs an essential function of preventing the glare. Additionally, the surface of the louver 130 is surface treated to be well reflective or includes a reflective member attached thereto, so that the louver 130 is able to improve a luminous efficiency by functioning as a reflector, as well as to prevent the glare.

The case 100 may be produced by integrally assembling separately produced bottom plate 110, side wall 120 and louver 130 or may be entirely integrally produced. For example, the case 100 may be formed by using an extruding molding method. It is preferable that the case 100 is simultaneously integrally formed with the bottom plate 110, the side wall 120, the louver 130, the diffuser plate coupling groove 180, the first and the second bracket coupler 151 and 153, the power supply controller coupling groove 152 and the side cover coupling groove 154.

The case 100 is generally integrally formed in the direction of length thereof. If the case 100 is integrally formed by using the extruding molding method and the like, the cross section formed by cutting the case 100 in a direction perpendicular to the longitudinal direction thereof has a uniform shape. For example, the shape of the cross section formed by cutting the middle part of the case 100 is the same as the shape of the cross section formed by cutting a part close to the end of the case 100. When the case 100 is integrally produced, it is possible to reduce the efforts to assemble the various members and to simplify the manufacturing process.

In producing the case 100, it is not necessary that the described diffuser plate coupling groove 180, the first and the second bracket coupler 151 and 153, the power supply controller coupling groove 152 and the side cover coupling groove 154 and the like are simultaneously produced. It is also possible to allow at least one member to be integrally produced with the case 100.

For example, if necessary, the case 100 may be produced to include only the bottom plate 110, the side wall 120, the louver 130 and the diffuser plate coupling groove 180 formed therein. Otherwise, the case 100 may be produced to include only the bottom plate 110, the side wall 120, the louver 130 and the first and the second bracket coupler 151 and 153 formed therein.

Referring to FIG. 8, the diffuser plate coupling groove 180 may be formed at the boundary between the inner surface of the side wall 120 and the upper surface of the louver 130. Referring to FIGS. 11 and 12, when the top plate 140 is provided instead of the louver 130, the diffuser plate coupling groove 180 may be formed in the middle of the inner surface of the side wall 120 or at the point, which is close to the top plate 140, of the inner surface of the side wall 120.

Referring to FIG. 8, at least one of the first and the second bracket coupler 151 and 153, the power supply controller coupling groove 152 and the side cover coupling groove 154 may be formed on the outer surface of the side wall 120 of the case 100 or on the bottom surface of the louver 130. Referring to FIGS. 11 and 12, when the top plate 140 is provided instead of the louver 130, at least one of the first and the second bracket coupler 151 and 153, the power supply controller coupling groove 152 and the side cover coupling groove 154 may be formed on the outer surface of the side wall 120 of the case 100 or on the bottom surface of the top plate 140.

The case 100 is integrally formed. Therefore, since heat can be effectively transferred to the entire case 100 and be radiated, the lighting device can have a good heat radiating characteristic. Based on an embodiment, the louver 130 may be replaced by the top plate 140. In more detail, when the case 100 is formed by assembling separately produced members, the members do not come in complete contact with each other but come in partial point contact with each other.

As a result, heat transferred from the light emitter 200 to the bottom plate 110 is not sufficiently transferred to the side wall 120, and the heat of the side wall 120 is not sufficiently transferred to the louver 130, either. Therefore, all members of the case 100 cannot be sufficiently used as a heat radiating body. However, when the case 100 is integrally formed by using an extruding molding method, the entire case 100 corresponds to a single member. Therefore, heat generated by the light emitter 200 or the power supply controller 20 is uniformly transferred from the bottom plate 110 through the side wall 120 to the louver 130, so that an excellent heat radiating effect is obtained.

The heat radiating effect will be additionally described. As described in the fifth embodiment, an additional member forming the case 100 may be formed in the lower part of the outermost louver 130. The additional member is intended to improve the heat radiating effect by increasing the surface area of the case 100. For this reason, the case 100 may have any shape capable of enhancing the heat radiating effect by enlarging the surface area thereof. Accordingly, the additional member is able to form a closed surface with the louver 130 and the side wall 120. The closed surface may have heat radiating holes formed therein. Also, the louver 130 or the side wall 120 may have an uneven structure formed thereon and function as a heat radiating fin.

Figure 39:
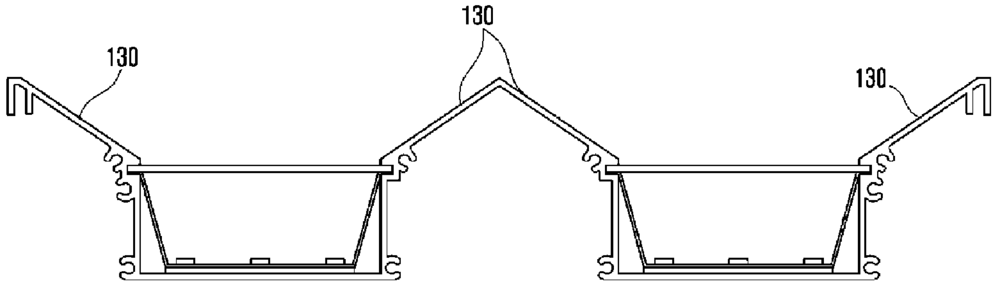
FIG. 39 is a diagram of a lighting module using louvers having one shape.
Figure 40:
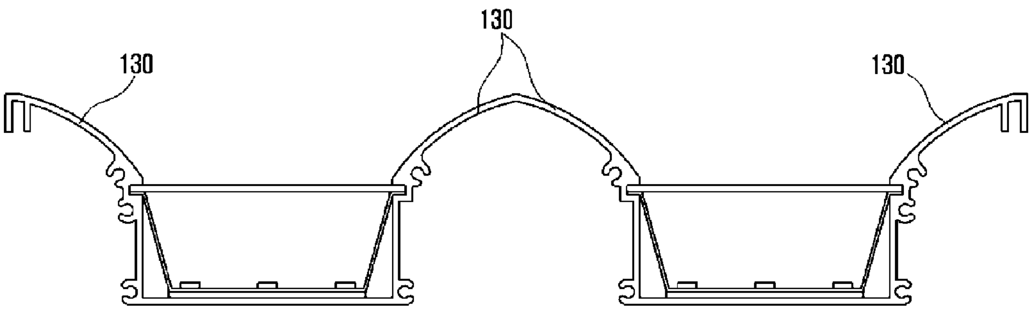
FIG. 40 is a diagram of a lighting module using louver having another shape.

FIG. 39 shows a lighting module including louvers 130 having one shape, and FIG. 40 shows a lighting module including a louver 130 having a different shape. Referring to FIGS. 39 and 40, the louver 130 may have a cross section having various shapes such as a rectilinear shape, a parabolic shape or a circular arc shape and the like. However, how much louver cut-off angle "θ" the louver 130 has is more meaningful than what shape itself the louver 130 has.

The lighting device including the louver 130 formed therein has its specific louver cut-off angle "θ". It is the most important objective that the glare is prevented by allowing the diffuser plate 300 not to directly come into sight at the specific louver cut-off angle "θ". Therefore, the lighting device is required to have an appropriate louver cut-off angle "θ".

Figure 41:
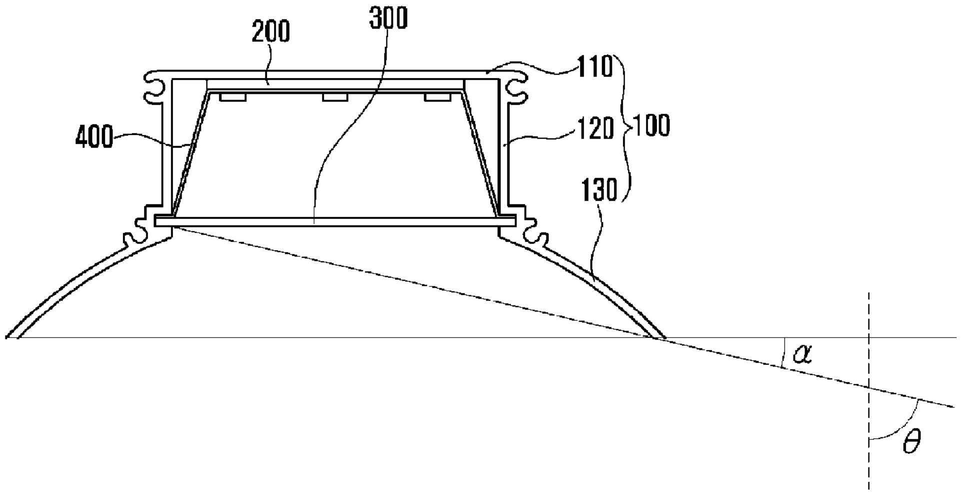
FIG. 41 is a diagram of a louver having a cut-off angle $\theta$ and a cover angle $\alpha$.
Figure 42:
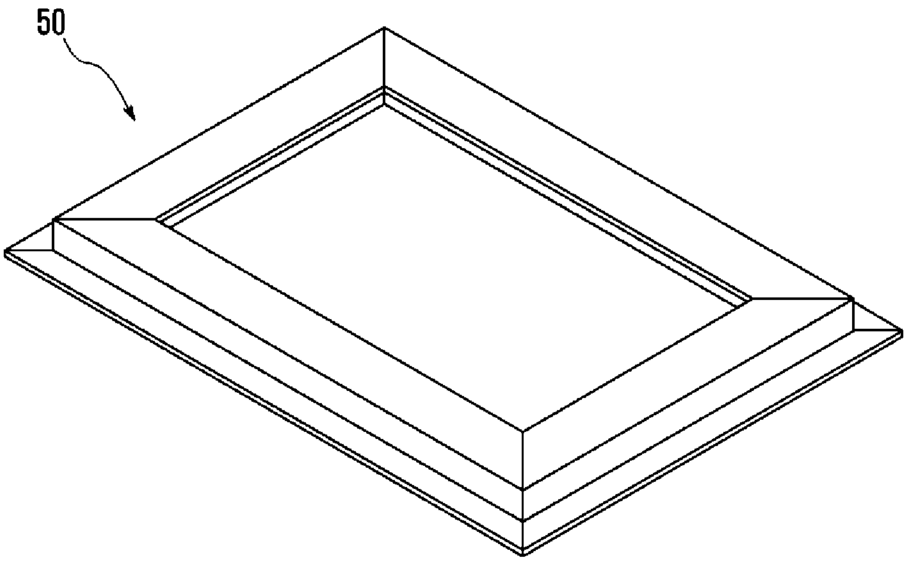
FIG. 42 is a diagram of a support frame used in one or more embodiments.

FIG. 41 is a view for describing a louver cut-off angle "θ" and a cover angle α of a cover angle. Referring to FIG. 41, unlike the louver 130 of FIG. 41, when the louver 130 is formed to be almost aligned with the side wall 120 so as to reduce the glare, the louver cut-off angle "θ" is reduced, and the cover angle α is increased. This means that the glare does not occur at an angle larger than the louver cut-off angle "θ". Therefore, the fatigue of the eyes caused by the glare can be reduced by being away at even a short distance from the lighting device. However, a light diffusion range is excessively reduced, so that the irradiated area becomes smaller.

On the contrary, unlike the louver 130 of FIG. 41, when the louver 130 is formed almost parallel with the side wall 120, the louver cut-off angle "θ" is increased, and the cover angle α is reduced. This means that the glare does not occur at an angle larger than the louver cut-off angle "θ". However, since the louver cut-off angle "θ" has been already excessively enlarged, the fatigue of the eyes caused by the glare may occur. Meanwhile, a light diffusion range is sufficiently increased, so that the irradiated area becomes larger.

Accordingly, a lighting device giving a priority to the increase of the area to which light is irradiated is required to enlarge the louver cut-off angle "θ". A lighting device giving a priority to the prevention of the glare is required to reduce the louver cut-off angle "θ". It is desirable that the louver cut-off angle "θ" has a value between 0° and 90°. When the louver cut-off angle "θ" has a value within the aforementioned range, direct light from the diffuser plate 300 cannot be seen as the lighting device is viewed from one side to the other side of the diffuser plate 300.

Since the light emitter 200 is arranged on the bottom plate 110 of the case 100, the bottom plate 110 has a width and a length for arranging the light emitter 200. The diffuser plate coupling groove 180 may be formed at a position where the side wall 120 and the louver 130 are in contact with each other. The diffuser plate 300 and/or a fixing protrusion 430 of the reflector 400 may be inserted and fixed into the diffuser plate coupling groove 180. The diffuser plate coupling groove 180 may have a shape extending in the first direction "a" shown in FIGS. 7, 13 and 19.

The diffuser plate 300 and/or a fixing protrusion 430 of the reflector 400 are pushed in a sliding way into the diffuser plate coupling groove 180. The side cover 40 is coupled to at least one end of the case 100. Then, the diffuser plate 300 and/or the reflector 400 are sufficiently securely fixed. As a result, when the lighting device is installed and operated or transported, the diffuser plate 300 and/or the reflector 400 are not expected to be separated from the lighting device.

Though FIGS. 1 to 3 show that the side wall 120 of the case 100 extends perpendicular to the bottom plate 110, the side wall 120 is not necessarily required to extend perpendicularly and may extend in a direction which is substantially close to perpendicular to the bottom plate 110. The farther it is from the bottom plate 110, the more outward the side wall 120 may be inclined. An uneven structure may be formed on the bottom surface of the case 100, so that the surface area of the case is increased and the heat radiating characteristic of the lighting device can be improved.

Light Emitters

Referring to FIGS. 9 and 10, light emitter 200 may include a plurality of LEDs 210, substrate 220 on which a plurality of the LEDs 210 are mounted, and heat radiating sheet 240 arranged under and in contact with the substrate 220. A plurality of the LEDs 210 may include at least one LED emitting red, green, blue, white and yellow light and the like. For example, a plurality of the LEDs 210 include a red LED, a green LED and a blue LED. Also, a plurality of the LEDs 210 may be formed through combination of LEDs emitting various colored lights.

A plurality of the LEDs 210 may be mounted on the substrate 220. A printed circuit board (PCB) may be used as the substrate 220. The PCB may be fabricated by printing a circuit pattern on an insulator and includes an aluminum substrate, a ceramic substrate, a metal core PCB and a usual PCB and the like. The surface of the substrate 220 may be coated with or painted with white or silver color in order to increase reflection efficiency.

The substrate 220 includes a circuit capable of starting and operating a plurality of the LEDs 210. As shown in FIGS. 9 and 10, a plurality of the LEDs 210 may be arranged along the rows and columns on the substrate 220 or arranged in various ways. The number of the LEDs may be greater or less than that of the LEDs 210 shown in the drawings. However, if the number of the LEDs is exceedingly small, the lighting device has a difficulty in functioning as a surface lighting device. Therefore, an appropriate number of the LEDs 210 is required to be arranged in consideration of the function of a surface lighting device.

A coupling hole 230 may be formed on the substrate 220. The substrate 220 may be coupled to the case 100 by inserting a screw or a pin into the coupling hole 230. The heat radiating sheet 240 is arranged contacting with the bottom surface of the substrate 220. The heat radiating sheet 240 receives heat generated from a plurality of the LEDs 210 through the substrate 220 and radiates the heat or transfers the heat to the entire case 100. The heat radiating sheet 240 may be made of a material capable of effectively radiating heat, such as a resin material or a metallic material. Also, the heat radiating sheet 240 may be made of a viscous material and easily adhered to the bottom surface of the substrate 220.

Reflector

Figure 22:
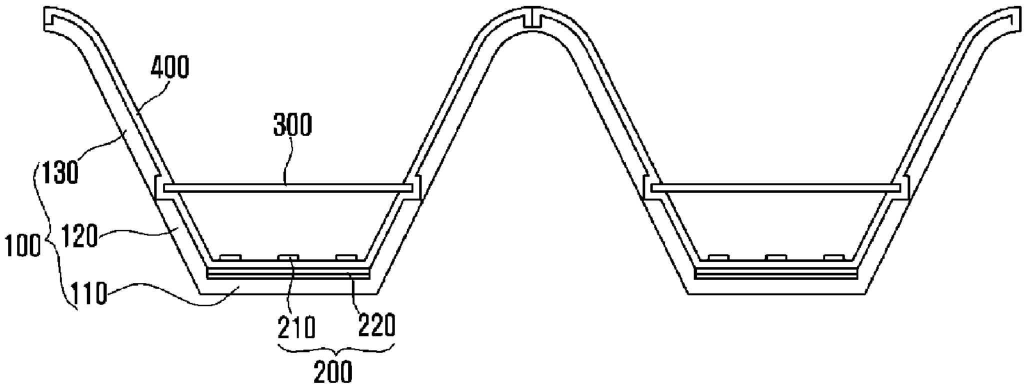
FIG. 22 is a diagram of a reflector used in one or more embodiments.

FIG. 22 shows another example of a reflector 400. The reflector 400 will be described with reference to FIGS. 9, 10 and 22.

The reflector 400 may be made of a resin material or a metallic material which has high reflexibility. The reflector 400 is located on the substrate 220 and covers the side wall 120 of the case 100. The resin material includes, for example, a pet resin, a PC resin and a PVC resin and the like. The metallic material includes, for example, Ag or an alloy including Ag, Al or an alloy including Al, a stainless material and the like. The reflector 400 includes a bottom reflector 410, a side reflector 420 extending from the both sides of the bottom reflector 410, and a fixing protrusion 430 extending outward from the end of the side reflector 420.

An LED hole 411 is formed in the bottom reflector 410 of the reflector 400. A plurality of the LEDs 210 are inserted into the LED holes 411 and shown. Therefore, the LED holes 411 are formed corresponding to the number and position of the LEDs 210. The LED hole 411 may be formed by a punching process and also may be formed by various methods capable of forming a hole, such as an etching process and the like. The side reflector 420 may be formed perpendicular to the bottom reflector 410. However, as shown in FIGS. 1 to 3, it is preferable that the side reflector 420 is inclined outward. When the side reflector 420 is inclined, light generated from a plurality of the LEDs 210 is effectively reflected and emitted.

Since the thickness of the fixing protrusion 430 of the reflector 400 is less than the width of the diffuser plate coupling groove 180 of the case 100, the fixing protrusion 430 can be pushed in a sliding way into the diffuser plate coupling groove 180. Accordingly, the reflector 400 can be fixed to the case 100.

The side reflector 420 may be formed extending from the bottom reflector 410 to the diffuser plate coupling groove 180 of the case 100. Meanwhile, as shown in FIG. 22, the side reflector 420 may extend to pass through the diffuser plate coupling groove 180 of the case 100 and even the side wall 120 of the case 100.

Referring to FIGS. 9 and 10, a first electrical connection hole 421 may be formed in the lower part of the side reflector 420 of the reflector 400. The light emitter 200 is electrically connected to the power supply controller 20 through the first electrical connection hole 421, so that electric power is supplied to the light emitter 200. A second electrical connection hole (not shown) is formed at a location of the lower part of the side wall 120 of the case 100. The location corresponds to the location of the first electrical connection hole 421 of the reflector 400. Consequently, the light emitter 200 can be electrically connected to the power supply controller 20 through the first electrical connection hole 421 and the second electrical connection hole.

Power Supply Controller

Figure 23:
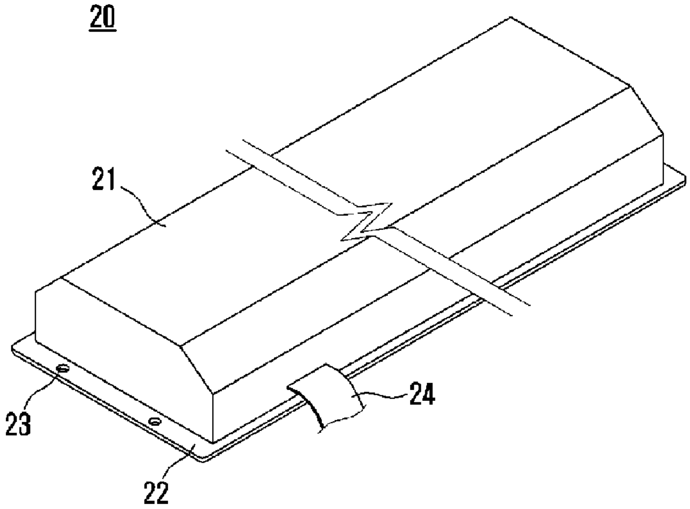
FIG. 23 is a diagram of a power supply controller used in one or more embodiments.
Figure 24:
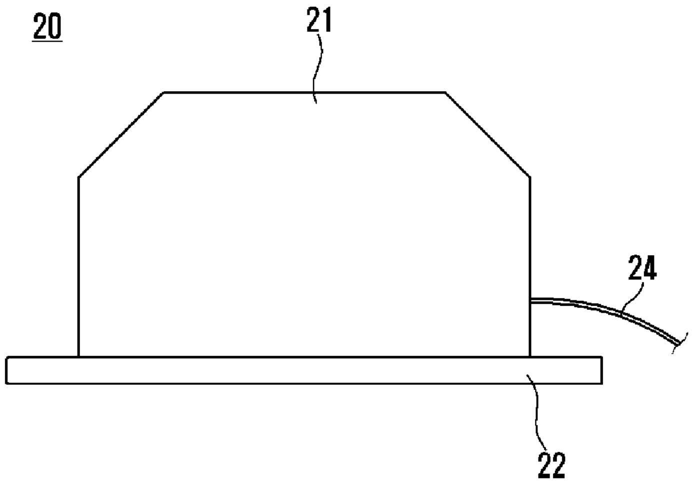
FIG. 24 is another view of the power supply controller.

Referring to FIGS. 23 and 24, the power supply controller 20 includes a body 21 and a second protrusion 22 formed in the lower end of the body 21. The body 21 may include a power supply unit (PSU, not shown) and a driving part (not shown) and the like. The driving part starts, operates and controls the light emitter 200. Since a sliding way by which the second projection 22 of the power supply controller 20 is coupled to the power supply controller coupling groove 152 of the case 100 has been already described, the description thereof will be omitted.

A third coupling hole 23 may be formed in the second projection 22. After the second projection 22 is inserted into the power supply controller coupling groove 152, a coupling screw or a pin and the like is inserted into the third coupling hole 23, so that the power supply controller 20 can be fixed to the case 100. But for the third coupling hole 23, the second projection 22 may be coupled to power supply controller coupling groove 152 by using an interference fit. The power supply controller 20 also includes a connection line 24. The connection line 24 allows the power supply controller 20 to be electrically connected to the light emitter 200.

Therefore, the power supply controller 20 is able to supply electric power and a driving signal to the light emitter 200. The connection line 24 connects the light emitter 200 with the power supply controller 20 through the first electrical connection hole 421 and the second electrical connection hole. The power supply controller 20 may be formed of a material having a good heat radiating characteristic, such as a metallic material or a resin material.

Since various components such as the PSU and a driving part and the like are included in the body 21 of the power supply controller 20, it is possible to effectively protect the components from an external impact, moisture and the like. The power supply controller 20 is easily coupled to or separated from the case 100, thereby easily changing the power supply controller 20.

Diffuser Plate

Referring to FIGS. 1 to 3 and 5, the diffuser plate 300 is formed over the light emitter 200. The diffuser plate 300 allows light emitted from the LED 210 functioning as a point light source to be emitted through the diffuser plate 300. The surface of the diffuser plate 300 may actually function as a surface light source such that the emitted light obtains a uniform luminance.

Both sides of the diffuser plate 300 is inserted in a sliding way into the diffuser plate coupling groove 180 of the case 100 in the first direction "a" shown in FIG. 5, so that the diffuser plate 300 is coupled to the case 100. The material of the diffuser plate 300 may be, for example, a glass material, PMMA and PC and the like.

Since the diffuser plate 300 is arranged over the light emitter 200 instead of on the entire surface of the lighting device 1, the amount of the used diffuser plate 300 can be reduced. The width of the diffuser plate 300 is considerably less than the length thereof. Both sides of the diffuser plate 300 is supported in the longitudinal direction thereof by the case 100. Therefore, the diffuser plate 300 is insignificantly bent or drooped, so that there is no problem in commonly using the lighting device 1.

Figure 25:
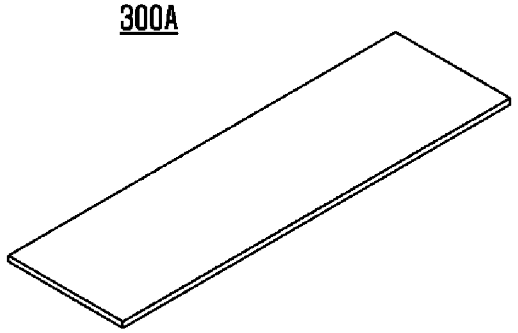
FIG. 25 is a diagram of a diffuser plate used in one or more embodiments.
Figure 26:
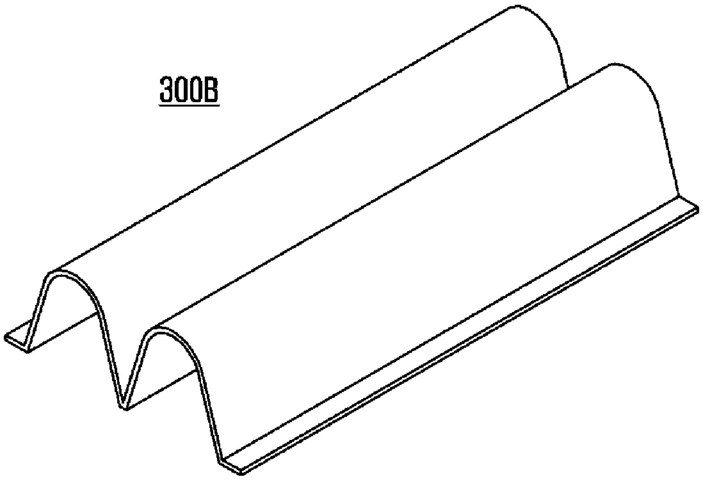
FIG. 26 is another view of the diffuser plate.
Figure 27:
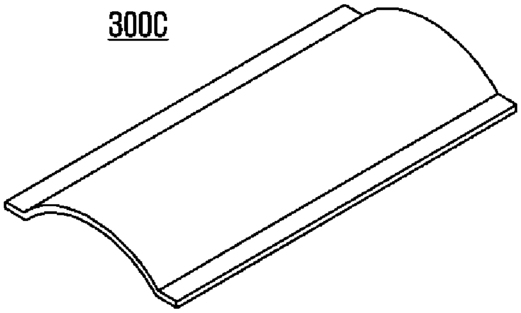
FIG. 27 is a diagram of another diffuser plate used in one or more embodiments.
Figure 28:
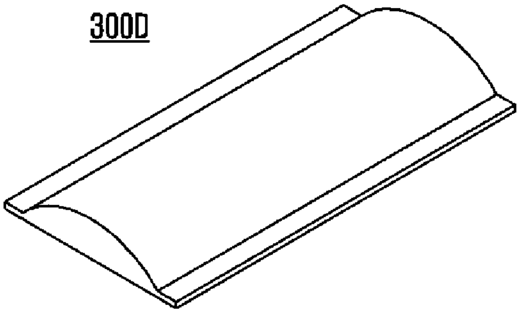
FIG. 28 is a diagram of another diffuser plate used in one or more embodiments.

FIG. 25 is a view showing an embodiment 300A of a diffuser plate. FIG. 26 is a view showing another embodiment 300B of a diffuser plate. FIG. 27 is a view showing further another embodiment 300C of a diffuser plate. FIG. 28 is a view showing yet another embodiment 300D of a diffuser plate.

Referring to FIGS. 25 to 28, it is understood that the diffuser plate 300 may have various shapes for diversely controlling the light distribution of the emitted light of the light emitter 200. For example, in FIG. 25, the diffuser plate 300A may have a flat shape. In FIG. 26, the diffuser plate 300B may have a shape having two paraboloids. In FIG. 27, the diffuser plate 300C may have a convex paraboloid and also have a concave paraboloid. In FIG. 28, the light incident surface of the diffuser plate 300D is flat and the light emitting surface of the diffuser plate 00D is convex.

While it is preferable that the diffuser plate 300 has a rectangular shape extending in the first direction "a", this is not necessarily required. It is often that the diffuser plate 300 usually has a flat shape. However, the diffuser plate 300 may have various shapes capable of controlling the light distribution of the light emitter 200.

Side Cover

Figure 29:
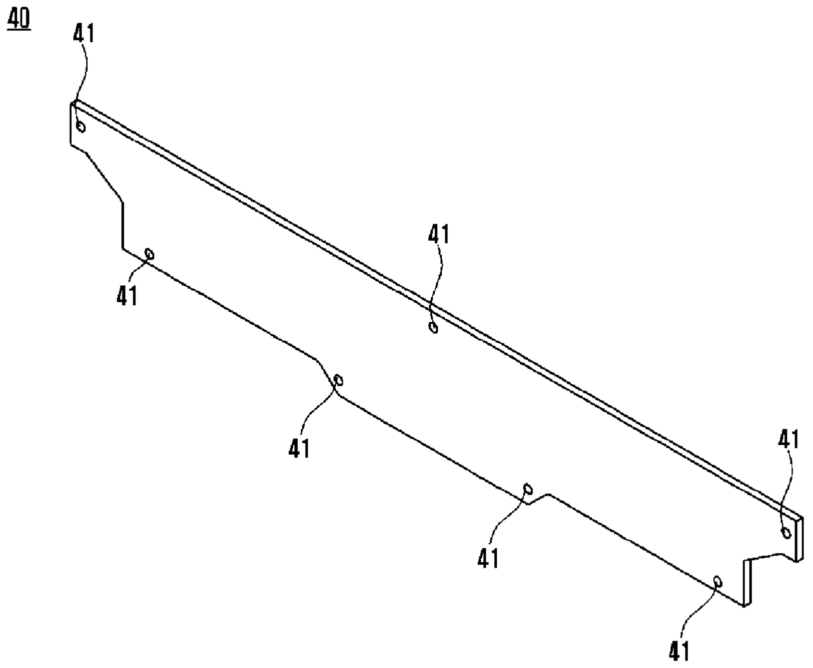
FIG. 29 shows a side cover that may be used in one or more embodiments.
Figure 30:
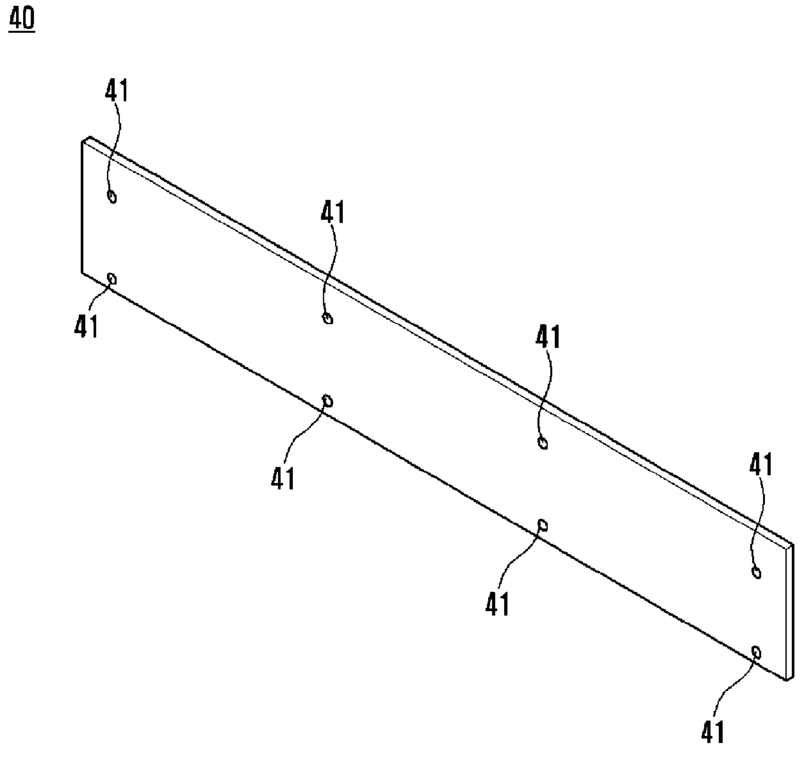
FIG. 30 is a diagram of another type of side cover.

FIG. 29 shows one embodiment of side cover 40, and FIG. 30 shows another embodiment of the side cover. At least one end of the case 100 shown in FIGS. 4, 7, 13 and 19 may include the side cover 40. It is desirable for some applications that the side cover 40 is formed on both ends of the case 100. The side cover 40 is able to prevent moisture and filth, etc., from penetrating into the case 100, to improve the rigidity of the lighting device and to fix the light emitter 200 and the power supply controller 20 which are received by the case 100.

The side cover 40 may include a plurality of coupling holes 41. The case 100 may also include a plurality of side cover coupling grooves 154. After the side cover coupling groove 154 of the case 100 and the coupling hole 41 of the side cover 40 are aligned with each other, the case 100 is coupled to the side cover 40 by allowing a screw or a pin to pass through the side cover coupling groove 154 and the coupling hole 41. As indicated, the side cover 40 is able to prevent dust or filth from penetrating into the case 100 and to more improve the rigidity of the case 100.

After a plurality of the coupling holes 41 are arranged such that a plurality of the side cover coupling grooves 154 can be seen, the side cover 40 is coupled to the case 100 by allowing a screw or a pin to pass through a plurality of the coupling holes 41 and a plurality of the side cover coupling grooves 154. The coupling hole 41 of the side cover 40 is not necessarily formed at a location corresponding to the location of the side cover coupling groove 154.

The coupling hole 41 of the side cover 40 may be formed at a location corresponding to the first bracket coupler 151, the power supply controller coupling groove 152 and the second bracket coupler 153, which are formed in the case 100. In this case, more screws or pins are inserted into the first bracket coupler 151, the power supply controller coupling groove 152 and the second bracket coupler 153, so that the side cover 40 and the case 100 are coupled to each other.

Since the height and width of the side cover 40 may be formed to be equivalent to those of the case 100, the shape of the side cover 40 may be varied as shown in FIGS. 29 and 30.

In addition, since the material of the side cover 40 may be the same as that of the case 100, the detailed description thereof will be omitted.

Bracket

Figure 31:
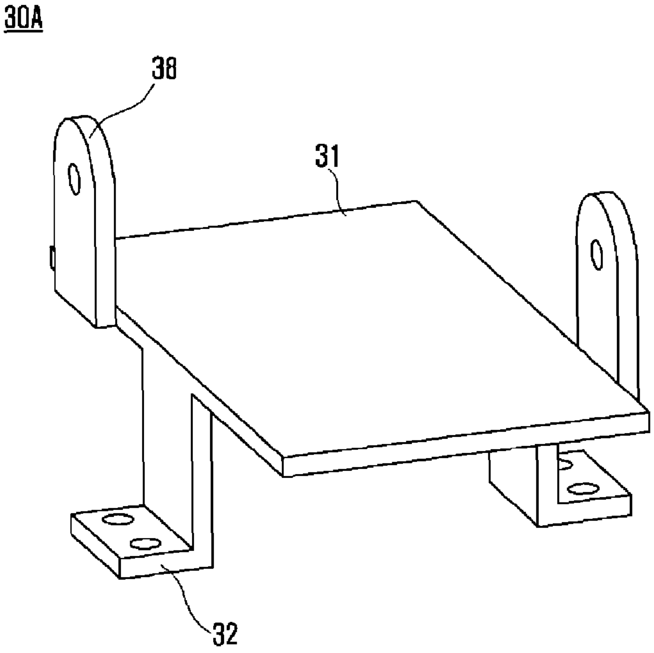
FIG. 31 is a diagram of a bracket used in one or more embodiments.
Figure 32:
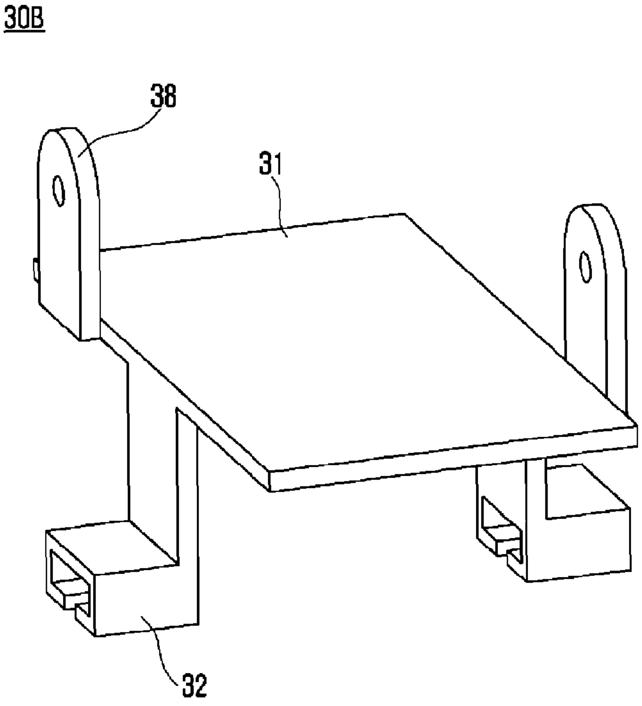
FIG. 32 is a diagram of another bracket.
Figure 33:
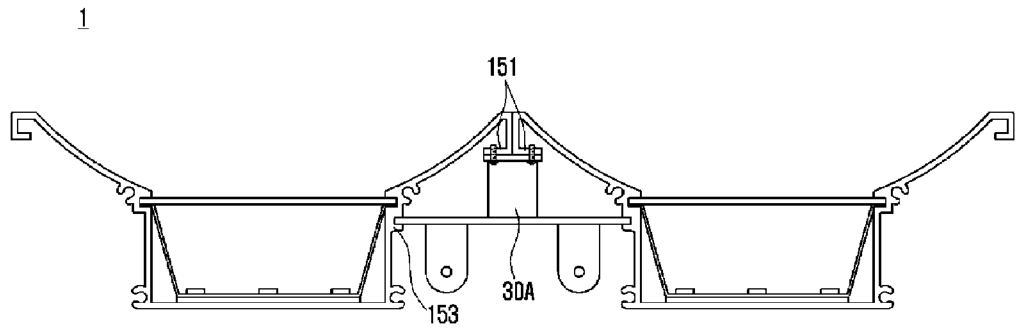
FIG. 33 is diagram of another embodiment of a lighting device to which a single lighting module is coupled by using a bracket.
Figure 34:
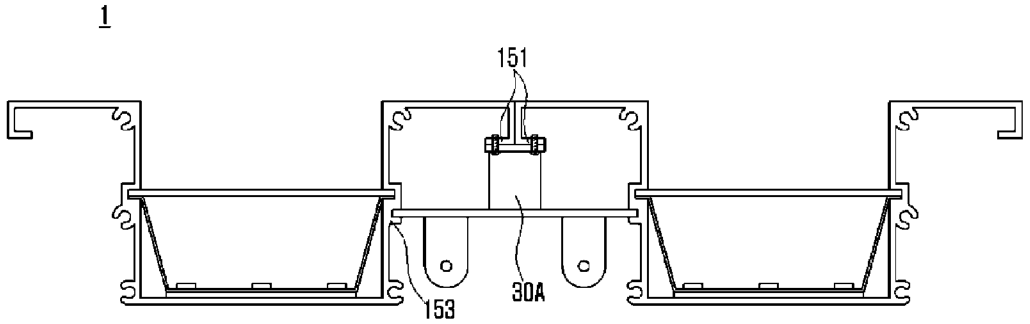
FIG. 34 is a diagram showing another embodiment of a lighting device to which a single lighting module is coupled by using a bracket.
Figure 35:
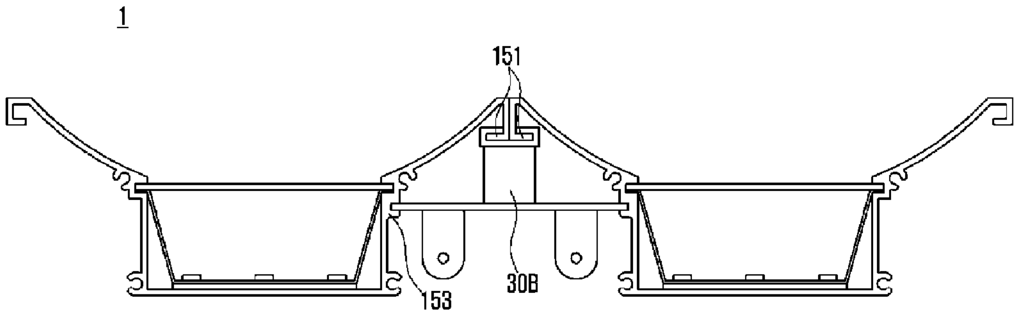
FIG. 35 is a diagram of another embodiment of a lighting device to which a single lighting module is coupled by using a bracket.
Figure 36:
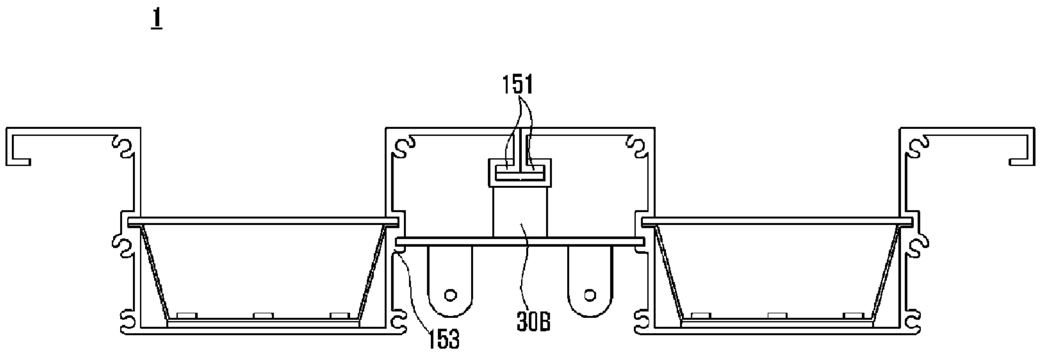
FIG. 36 is a diagram of another embodiment of a lighting device to which a single lighting module is coupled by using a bracket.

FIG. 31 shows an embodiment 30A of a bracket 30, FIG. 32 shows another embodiment 30B of a bracket 30, FIG. 33 shows another embodiment of a lighting device to which a single lighting module is coupled by using the bracket 30A. and FIG. 34 shows another embodiment of a lighting device to which a single lighting module is coupled by using the bracket 30A. In addition, FIG. 35 shows another embodiment of a lighting device to which a single lighting module is coupled by using the bracket 30B, and FIG. 36 shows another embodiment of a lighting device to which a single lighting module is coupled by using the bracket 30B.

Referring to FIGS. 31 and 32, the brackets 30A and 30B include a fixed plate 31, a lighting module coupling member 32 which extends from one end of the fixed plate 30 and is coupled to the first bracket coupler 151 of the case 100, and a safety ring 38 extending from one end of the fixed plate 30. The lighting module coupling member 32 and/or the safety ring 38 may be formed not only at one end of the fixed plate 30, but at the other end of the fixed plate 30.

Referring to FIGS. 6 and 11, it can be seen that how the case 100 is coupled to the bracket 30 in the first embodiment and that how the case 100 is coupled to the bracket 30 in the second embodiment. The fixed plate 30 is pushed in a sliding way into the second bracket coupler 153 of the case 100. As the lighting module coupling member 32 has a through hole, the lighting module coupling member 32 is coupled to the first bracket coupler 151 of the case 100 by allowing a screw or a pin to pass through the through hole.

Referring to FIGS. 33 and 34, the first bracket coupler 151 of the case 100 has a shape different from that of FIGS. 6 and 11. However, a method by which the case 100 is coupled to the bracket 30 is the same as that of FIGS. 6 and 11. That is, the fixed plate 30 is pushed in a sliding way into the second bracket coupler 153 of the case 100. As the lighting module coupling member 32 has a through hole, the lighting module coupling member 32 is coupled to the first bracket coupler 151 of the case 100 by allowing a screw or a pin to pass through the through hole.

Referring to FIGS. 35 and 36, as compared with the bracket 30A shown in FIGS. 33 and 34, the bracket 30B also includes the fixed plate 30 and the safety ring 38. However, the shape of the lighting module coupling member 32 and a method by which the lighting module coupling member 32 is coupled to the first bracket coupler 151 of the case 100 are different from those of FIGS. 33 and 34. The lighting module coupling member 32 does not include a through hole through which a screw or a pin passes.

Instead, the lighting module coupling member 32 has a shape capable of hanging over and being fixed to the first bracket coupler 151. The first bracket coupler 151 used in this case has a shape different from that of the first bracket coupler 151 shown in FIGS. 6, 11, 33 and 34. Unlike the bracket 30A shown in FIGS. 31, 33 and 34, the bracket 30B shown in FIGS. 32, 35 and 36 can be coupled in a sliding way to the first bracket coupler without a screw or a pin. The first bracket coupler 151 is formed at one end of the louver 130 of the case 100. The second bracket coupler 153 is formed in the louver 130 or in the side wall 120.

Meanwhile, when the top plate 140 is provided instead of the louver 130, like the second embodiment shown in FIGS. 11 and 12, the first bracket coupler 151 is formed at one end of the top plate 140 of the case 100, and second bracket coupler 153 is formed in side wall 120.

The safety ring 38 prevents the provided lighting device 1 from being separated from the provided position or being damaged by falling down to the ground due to earthquake or other impacts, or prevents a person who is under the lighting device 1 from being hurt. A rope passing through the safety ring 38 is fixed within the ceiling. In this case, even though the lighting device 1 is separated from its provided position by impact, the rope fixed within the ceiling holds the safety ring 38 and prevents the lighting device 1 from falling down to the bottom surface. Therefore, the bracket 30 having the safety ring 38 includes not only an original function of connecting the single lighting modules, but an additional function of obtaining safety.

It is not necessary that only one bracket 30 is coupled to the case 100 in the longitudinal direction of the case 100. A plurality of the brackets 30 may be coupled to the case 100 so as to improve the coupling rigidity between the single lighting modules or so as to obtain safety.

Figure 37:
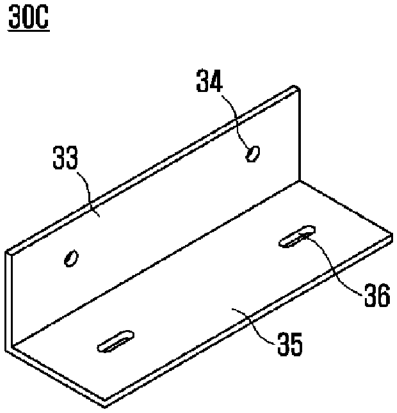
FIG. 37 is a diagram of another embodiment of a bracket.
Figure 38:
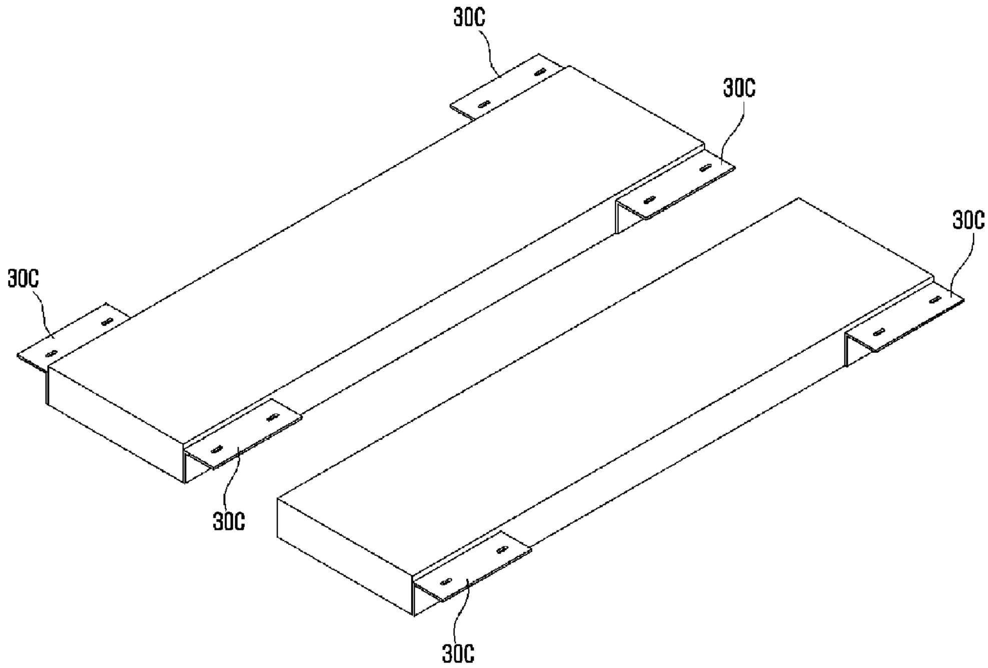
FIG. 38 is a diagram showing one way in which a bracket interconnects with a single lighting module.

FIG. 37 shows another embodiment 30C of a bracket 30, and FIG. 38 shows a structure in which the bracket 30C interconnects the single lighting modules 10.

Referring to FIG. 38, a plurality of the brackets 30C may be arranged on the lighting device 1, that is, the outer lateral surface of the case 100. The bracket 30C having such a shape is used to interconnect the cases 100 having no separate first bracket coupler 151, like the case 100 shown in FIGS. 17 and 18 or the case 100 shown in FIG. 38. The bracket 30C includes two planes which are in contact with each other at a right angle. The two planes include a first plane 33 coupled to the outer lateral surface of the case 100, and a second plane 35 coupled to an outer support member such as a ceiling or a wall surface, etc., or to the outer lateral surface of the case 100. The first plane 33 includes a first coupling hole 34, and the second plane 35 includes a second coupling hole 36.

The single lighting modules are interconnected by inserting a coupling screw, etc., into the first and the second coupling holes 34 and 36. Also, the lighting device 1 may be coupled to an outer support member by inserting a coupling screw, etc., into the first and the second coupling holes 34 and 36. The bracket 30C may be integrally formed with the case 100.

Support Frame

Figure 43:
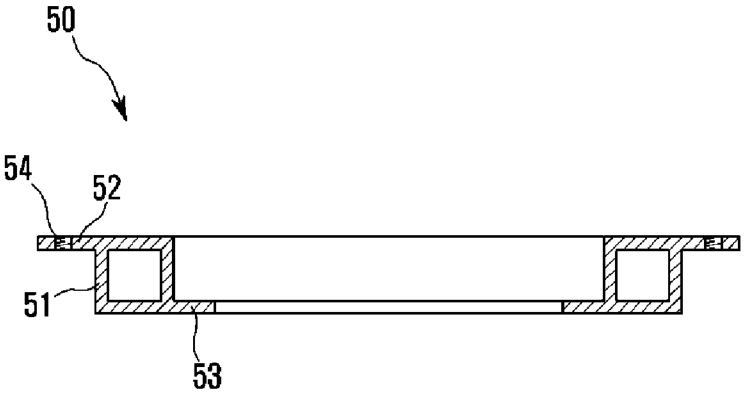
FIG. 43 is another view of the support frame.

Referring to FIGS. 42 to 45, a support frame 50 includes a frame body 51 surrounding the outer lateral surface of the case 100, a case support 53 extending from the inner lateral surface of the frame body 51 and supporting the weight of the case 100, a ceiling fixed part 52 extending from the outer lateral surface of the frame body 51 and being fixed to the ceiling. As shown in FIG. 43, the frame body 51 may have an inner empty space in order to reduce its weight.

The case support 53 comes in contact with the end of the louver 130 of the case 100 and supports the weight of a member including the case 100 and forming a lighting device. It is required that a distance between the case supports 53 located at a position corresponding to the side cover 40 should be somewhat shorter than a distance between the outermost louvers 130 of the lighting device so as to prevent the members of the lighting device other than the support frame 50 from dropping through an opening of the support frame 50. If the distance between the between the case supports 53 is shorter than necessary, the inclined plane of the louver 130 is hidden. This may not preferable for all applications. Therefore, the distance between the case supports 53 should be formed in such a manner that the inclined plane of the louver 130 is not hidden.

The ceiling fixed part 52 fixes the lighting device to the ceiling. Moreover, if there is a space between the case 100 and the ceiling on which the case 100 is installed, the ceiling fixed part 52 hides the space and allows the lighting device to have a beautiful appearance. The ceiling fixed part 52 may have a ceiling coupling groove 54.

Figure 44:
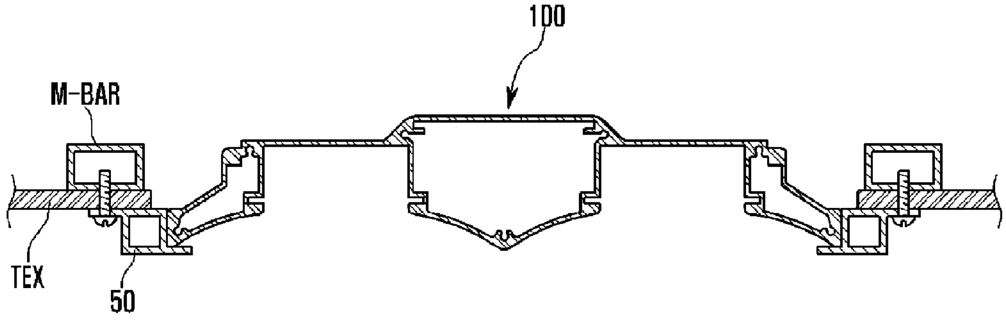
FIG. 44 is a diagram of a support frame coupled to an M-BAR.
Figure 45:
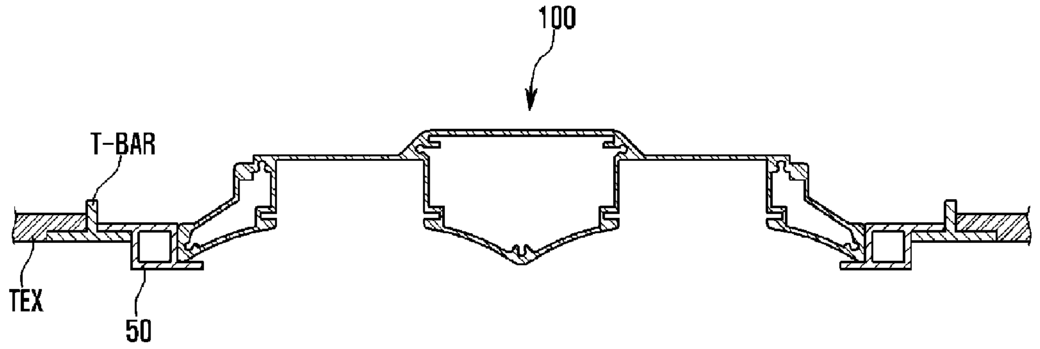
FIG. 45 is a diagram showing a support frame coupled to a T-BAR.

Referring to FIGS. 43 and 44, the lighting device may be fixed to the ceiling by allowing a screw to pass through the ceiling coupling groove 54, TEX and an M-BAR. Because of the weight of the lighting device itself, the lower surface of the ceiling fixed part 52 contacts with T-BAR. Under this condition, the lighting device is fixed to the ceiling. In this case, the ceiling fixed part 52 does not necessarily include the ceiling coupling groove 54. However, considering that the lighting device is installed in the M-BAR as well as the T-BAR, it may be desirable for some applications that the ceiling fixed part 52 includes the ceiling coupling groove 54.

In particular, the support frame 50 can be flexibly used for various installation environments. The area of a ceiling on which lighting devices are installed are changed according to countries or a ceiling structure. In the embodiments described above, a lighting device having various sizes is created through combination of the single lighting modules 10. However, if the lighting device fixed to the ceiling has an empty space formed between the ceiling and the lighting device, the lighting device has a bad appearance and is unstably fixed.

In this case, if several tens of to hundreds of the standards of the single lighting module 10 are provided to overcome the problems in order to be securely fixed and to obtain a beautiful appearance, there occur problems, for example, an increase of a manufacturing cost, and the like. Therefore, as described in the aforementioned embodiments, when the several single lighting modules 10 having a predetermined size are used, and when the support frame 50 having various sizes is applied with respect to the empty space between the lighting device and the ceiling, the lighting device is able to have a beautiful appearance and be stably fixed.

A member used to form the support frame 50 extends in a longitudinal direction thereof. The cross section formed by cutting the member in a direction parallel with the longitudinal direction thereof has a uniform shape. When a rectangular shape is formed by dividing the member into four pieces and connecting the edges of the pieces, the support frame 50 having a necessary size can be obtained. Accordingly, it may be possible to cause the production process of the support frame 50 to be very simple and to allow the support frame 50 to be used for various ceilings. Particularly, if the member has a fixed standard except the length of the ceiling fixed part 52, the support frame 50 can be almost completely used for various ceilings.

In accordance with one embodiment, a lighting device is formed by coupling two single lighting modules, wherein the first single lighting module includes a light emitter including a plurality of LEDs; a diffuser plate spaced from the light emitter in a direction in which light is irradiated from the LEDs; and a case receiving the light emitter. The case includes: a bottom plate on which the light emitter is seated; a side wall vertically extending from the both ends of the bottom plate; and a louver extending from the ends of the side walls and inclined at an obtuse angle with respect to the surface of the diffuser plate; wherein a first bracket coupler for interconnecting the single lighting modules is formed at one end of the louver on only one side among the louvers.

In accordance with another embodiment, a lighting device is formed by coupling two single lighting modules, wherein the first single lighting module includes a light emitter including a plurality of LEDs; a diffuser plate spaced from the light emitter in a direction in which light is irradiated from the LEDs; and a case receiving the light emitter. The case includes: a bottom plate on which the light emitter is seated; a side wall vertically extending from the both ends of the bottom plate; and a top plate extending from the end of the side wall; wherein a first bracket coupler for interconnecting the single lighting modules is formed at one end of the top plate on only one side among the top plates.

In accordance with another embodiment, a lighting device is formed by coupling a plurality of single lighting modules, wherein the single lighting module includes a light emitter including a plurality of LEDs; a diffuser plate spaced from the light emitter in a direction in which light is irradiated from the LEDs; and a case receiving the light emitter. The case includes: a bottom plate on which the light emitter is seated; a side wall vertically extending from the both ends of the bottom plate; and a louver extending from the ends of the side walls and inclined at an obtuse angle with respect to the surface of the diffuser plate; wherein a first bracket coupler for interconnecting the single lighting modules is formed at the end of the louver.

In accordance with another embodiment, a lighting device is formed by coupling a plurality of single lighting modules, wherein the single lighting module includes: a light emitter including a plurality of LEDs; a diffuser plate spaced from the light emitter in a direction in which light is irradiated from the LEDs; and a case receiving the light emitter. The case includes: a bottom plate on which the light emitter is seated; a side wall vertically extending from the both ends of the bottom plate; and a top plate extending from the end of the side wall; wherein a first bracket coupler for interconnecting the single lighting modules is formed at the end of the top plate.

In accordance with another embodiment, a lighting device is formed by coupling two single lighting modules and at least one second single lighting module located between the two first single lighting modules. The first single lighting module includes: a light emitter including a plurality of LEDs; a diffuser plate spaced from the light emitter in a direction in which light is irradiated from the LEDs; and a case receiving the light emitter. The case includes: a bottom plate on which the light emitter is seated; a side wall vertically extending from the both ends of the bottom plate; and a louver extending from the ends of the side walls and inclined at an obtuse angle with respect to the surface of the diffuser plate. Also, a first bracket coupler for interconnecting the single lighting modules is formed at one end of the louver on only one side among the louvers.

The second single lighting module includes a light emitter including a plurality of LEDs; a diffuser plate spaced from the light emitter in a direction in which light is irradiated from the LEDs; and case receiving the light emitter. The case includes: a bottom plate on which the light emitter is seated; a side wall vertically extending from the both ends of the bottom plate; and a louver extending from the ends of the side walls and inclined at an obtuse angle with respect to the surface of the diffuser plate; wherein a first bracket coupler for interconnecting the single lighting modules is formed at the end of the louver.

In accordance with another embodiment, a lighting device is formed by coupling two single lighting modules and at least one second single lighting module located between the two first single lighting modules, The first single lighting module includes: a light emitter including a plurality of LEDs; a diffuser plate spaced from the light emitter in a direction in which light is irradiated from the LEDs; and a case receiving the light emitter.

The case includes: a bottom plate on which the light emitter is seated; a side wall vertically extending from the both ends of the bottom plate; and a top plate extending from the end of the side wall; wherein a first bracket coupler for interconnecting the single lighting modules is formed at one end of the top plate on only one side among the top plates.

The second single lighting module includes: a light emitter including a plurality of LEDs; a diffuser plate spaced from the light emitter in a direction in which light is irradiated from the LEDs; and a case receiving the light emitter.

The case includes: a bottom plate on which the light emitter is seated; a side wall vertically extending from the both ends of the bottom plate; and a top plate extending from the end of the side wall; wherein a first bracket coupler for interconnecting the single lighting modules is formed at the end of the top plate.

In accordance with another embodiment, a lighting device is formed by coupling at least one single lighting module, wherein the single lighting module includes: two light emitters including a plurality of LEDs; a diffuser plate spaced from the light emitter in a direction in which light is irradiated from the LEDs; and a case receiving the light emitter. The case includes: two bottom plates on which the two light emitters are seated; four side walls vertically extending from the both ends of the two bottom plates; and four louvers extending from the ends of the four side walls and inclined at an obtuse angle with respect to the surface of the diffuser plate; wherein a first bracket coupler for interconnecting the single lighting modules is formed at the end of at least one outermost louver among two outermost louvers.

In accordance with another embodiment, a lighting device is formed by coupling at least one single lighting module, wherein the single lighting module includes: two light emitters including a plurality of LEDs; a diffuser plate spaced from the light emitter in a direction in which light is irradiated from the LEDs; and a case receiving the light emitter. The case includes: two bottom plates on which the two light emitters are seated; four side walls vertically extending from the both ends of the two bottom plates; and a top plate connecting the ends of two inner side walls among the four side walls, and two top plates extending from the ends of the outermost two side walls; and a first bracket coupler for interconnecting the single lighting modules is formed at the end of at least one outermost top plate among two outermost top plates.

In accordance with another embodiment, a lighting device includes a first lighting module; a second lighting module; a case coupled to the first and second lighting modules; and a power circuit between the first and second lighting modules, wherein: each of the first and second lighting modules includes a plurality of light emitting diodes (LEDs), and bottom surfaces of the first and second lighting modules and the power circuit are aligned on substantially a same plane. In addition, one or more diffusers to diffuse light emitted from the first and second lighting modules, and one or more reflectors to reflect light from the first and second lighting modules.

The case may include surfaces for guiding or blocking light generated from the first and second lighting modules. The surfaces are aligned with respective ones of the reflectors, and an aligned surface of the first lighting module is coupled to an aligned surface of the second lighting module. The surfaces may be linear or curved, and at least one of the surfaces includes a coupler to couple the device to a ceiling.

In addition, side covers are coupled to opposing sides of the case to enclose the power circuit in a space between the first and second lighting modules, and the case may be made of an integral piece formed from an extruded material.

The lighting device may further include a third lighting modules coupled to one of the first or second lighting modules, the power circuit to power the first, second, and third lighting modules. Coupling members may be included to hold the first and second lighting modules. The coupling members may be integrally formed with the case.

Also, the LEDs of the first and second lighting modules may be formed on different substrates, and the substrates may be substantially of a same width as a base of the first and second lighting modules. The case includes first and second recesses which are substantially rectangular in shape and wherein the first and second lighting modules are disposed in respective ones of the first and second recesses. Each of the first and second lighting modules includes multiple rows of LEDs formed on a different substrate.

In addition, the power control circuit may be attached to the casing through one or more fasteners, a first diffuser may be located over the first lighting module; and a second diffuser may be located over the second lighting module. The first and second diffusers are substantially coplanar with one another.

In one or more of the aforementioned embodiments, there is no particular criterion for an upper surface and a lower surface of each component layer, as the drawings are regarded as the criterion. Here, on the basis of the drawings, it is generally assumed that a surface on which a bottom plate of a case is located is a lower surface, and a surface on which a diffuser plate is located is an upper surface. However, in FIGS. 7, 13, 19 and 41, it is assumed that a surface on which a bottom plate of a case is located is an upper surface, and a surface on which a diffuser plate is located is a lower surface. The top and bottom of each component layer will be described on the basis of the drawings.

Furthermore, a thickness or size of each component may be magnified, omitted or schematically shown for the purpose of convenience of description and clearness. The size of each component does not necessarily mean its actual size. In the case where a reference numeral is not added to a term of "a lighting device", it means that the lighting device includes lighting devices according to a first to a sixth embodiment.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Also, the features of one embodiment may be combined with the features of any other embodiment to form different embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. The lighting device comprising:

a case comprising:

a bottom plate;

a first wall extending from the bottom plate and comprising a first end and a second end;

a second wall extending from the bottom plate, comprising a first end and a second end and facing toward the first wall;

a first top plate connected to the first wall extending outwardly from the first end of the first wall; and a second top plate extending outwardly from the first end of the second wall, a light emitter disposed on the bottom plate of the case; and a diffuser plate spaced apart from the light emitter and disposed between the first wall and the second wall, wherein the first wall comprises a coupling recess disposed between the first end and the second end of the first wall, and wherein the diffuser plate is coupled to the coupling recess.

2. The lighting device of claim 1, wherein a length from the coupling recess of the first wall to a top end of the first wall is smaller than a length from the coupling recess of the first wall to a bottom end of the first wall.

3. The lighting device of claim 1, wherein a length from the coupling recess of the first wall to a top end of the first wall is greater than a length from the coupling recess of the first wall to a bottom end of the first wall.

4. The lighting device of claim 1, further comprising a reflector which is disposed on an inner surface of the case and reflects light emitted from the light emitter and directs the reflected light through the diffuser plate, wherein the reflector comprises a fixing protrusion which is inserted into the coupling recess.

5. The lighting device of claim 1, further comprising a member including one side coupled to the first wall and another side coupled to the first top plate, wherein the member, the first wall and the first top plate are formed in a closed space.

6. The lighting device of claim 1, wherein at least one of the first top plate and the second top plate comprises a bracket coupler.

7. The lighting device of claim 1, at least one of the first top plate and the second top plate comprises a ceiling fixed-type frame.

8. The lighting device of claim 1, further comprising a power circuit to power the light emitter, wherein the power circuit is disposed on an outer surface of the first wall.

9. The lighting device comprising:

a case comprising:

a bottom plate;

walls extending from ends of the bottom plate; and extension parts coupled to and inclined from at least one of the walls, and comprising at least one of a louver and a top plate, a light emitter disposed on the bottom plate of the case;

a diffuser plate spaced apart from the light emitter and disposed between the walls of the case; and side covers coupled to both ends of the case and having a coupling hole, wherein at least one of the walls and the extension parts comprises a coupling recess corresponding to the coupling hole of the side covers, wherein the side covers are coupled to the case by allowing a screw or a pin to pass through the coupling holes and the coupling recess.

10. The lighting device of claim 9, further comprising a power circuit to power the light emitter, wherein a part of the power circuit is coupled to the coupling recess.

11. The lighting device of claim 9, wherein the walls comprise a diffuser plate coupling recess, and wherein the diffuser plate is coupled to the diffuser plate coupling recess.

12. The lighting device of claim 11, further comprising a reflector which is disposed on an inner surface of the case and reflects light emitted from the light emitter and directs the reflected light through the diffuser plate, wherein the reflector comprises a fixing protrusion which is inserted into the coupling recess.

13. The lighting device comprising:

a case comprising:

a bottom plate;

a first wall extending from a first end of the bottom plate;

a second wall extending from a second end of the bottom plate;

a first louver coupled to and inclined from the first wall; and a second louver coupled to and inclined from the second wall, a light emitter disposed on the bottom plate of the case;

a diffuser disposed on the light emitter and disposed between the walls of the case, wherein at least one of the walls comprises a coupling recess and the diffuser plate is coupled to the coupling recess, wherein the first louver and the second louver are oriented at an obtuse angle relative to the diffuser plate, and wherein a louver cut-off angle of at least of the first louver and the second louver is less than 90 degrees above 0 degrees.

14. The lighting device of claim 13, further comprising a reflector which is disposed on an inner surface of the case and reflects light emitted from the light emitter and directs the reflected light through the diffuser plate, wherein the reflector comprises a fixing protrusion which is inserted into the coupling recess.

15. The lighting device of claim 14, wherein a first angle between the bottom plate and the first wall and a second angle between the bottom plate and the first louver are a same, wherein the reflector comprises a bottom reflector disposed on the light emitter, and a side reflector disposed on the first wall and the first louver, and wherein the side reflector comprises a coupling recess which is coupled to the diffuser plate.

16. The lighting device of claim 14, wherein the reflector comprises a bottom reflector disposed on the light emitter, and a side reflector disposed on the first wall, wherein the side reflector comprises a first electrical connection hole and wherein the first wall comprises a second electrical connection hole.

17. The lighting device of claim 13, further comprising further comprising a member including one side coupled to the first wall and another side coupled to the first louver, wherein the member, the first wall and the first louver are formed in a closed space.

18. The lighting device of claim 17, further comprising a support frame:

a frame body surrounding outer lateral surface of the case;

a case support extending from inner lateral surface of the frame body and supporting the weight of the case; and a ceiling fixed part extending from outer lateral surface of the frame body and being fixed to the ceiling, wherein the case support comes in contact with the end of the first louver, and wherein the frame body comes in contact with the member.

19. The lighting device of claim 18, wherein the frame body has an inner empty space.

20. The lighting device of claim 18, wherein the ceiling fixed part has ceiling coupling recess.

* * * * *